United States Patent [19]

Suzuki

[11] Patent Number: 5,289,570
[45] Date of Patent: Feb. 22, 1994

[54] PICTURE IMAGE EDITING SYSTEM FOR FORMING BOUNDARIES IN PICTURE IMAGE DATA IN A PAGE MEMORY DEVICE

[75] Inventor: Tadaomi Suzuki, Kanagawa, Japan

[73] Assignee: Fuji Xerox Co., Ltd., Tokyo, Japan

[21] Appl. No.: 596,156

[22] Filed: Oct. 10, 1990

[51] Int. Cl.⁵ .............................................. G06F 15/62
[52] U.S. Cl. ................................... 395/146; 395/148; 395/116; 358/450; 358/452; 355/114; 355/127
[58] Field of Search ................ 340/723; 395/148, 146, 395/116; 355/127, 114, 314; 358/450, 448, 452

[56] References Cited

U.S. PATENT DOCUMENTS

| | | | |
|---|---|---|---|
| 4,538,183 | 8/1985 | Kanno et al. | 358/280 |
| 4,811,242 | 2/1987 | Adachi | 364/519 |
| 4,949,188 | 8/1990 | Sato | 358/448 |
| 5,003,496 | 3/1991 | Hunt, Jr. et al. | 364/521 |
| 5,051,930 | 9/1991 | Kuwabara et al. | 364/523 |
| 5,083,119 | 1/1992 | Trevett et al. | 340/723 |
| 5,113,491 | 5/1992 | Yamazaki | 395/141 |
| 5,124,691 | 6/1992 | Sakamota et al. | 340/721 |

OTHER PUBLICATIONS

Apple Computer, Inc.; Hypercard User's Guide; 1988; pp. 125-140.

Primary Examiner—Gary V. Harkcom
Assistant Examiner—Joseph H. Feild
Attorney, Agent, or Firm—Finnegan, Henderson, Farabow, Garrett & Dunner

[57] ABSTRACT

A picture image editing system, incorporating a page memory device, having an editing subsystem and a boundary writing subsystem. The system is capable of writing desired boundary region data for at least some of the demarcating areas of a plurality of sets of picture image data to the page memory device, and of performing such writing operations in the course of or alternatively after the editing of the picture image data, such that boundary region data is present in a visually perceptible form, in a visually imperceptible form, or in a combination of both of these forms.

19 Claims, 34 Drawing Sheets

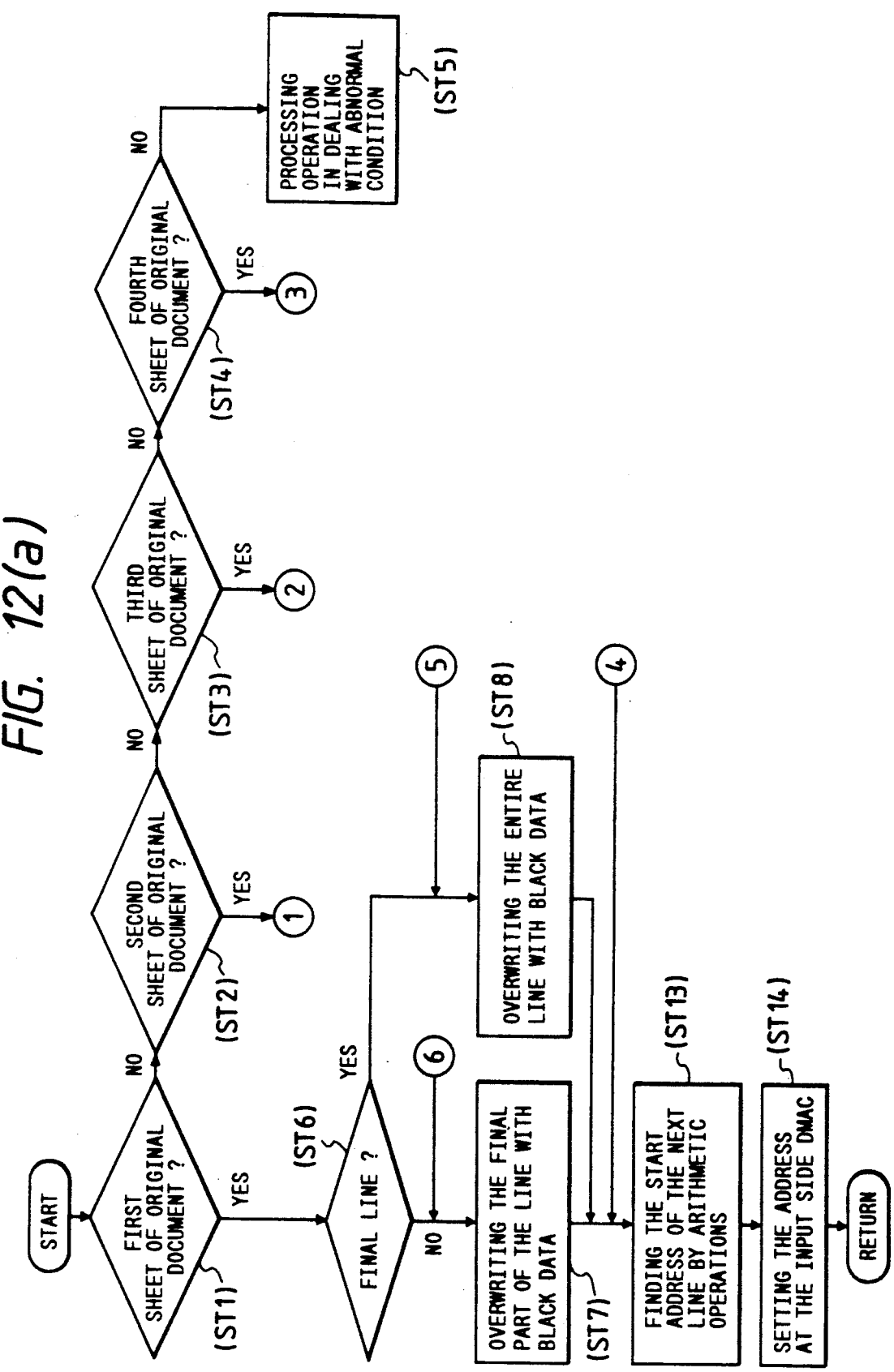

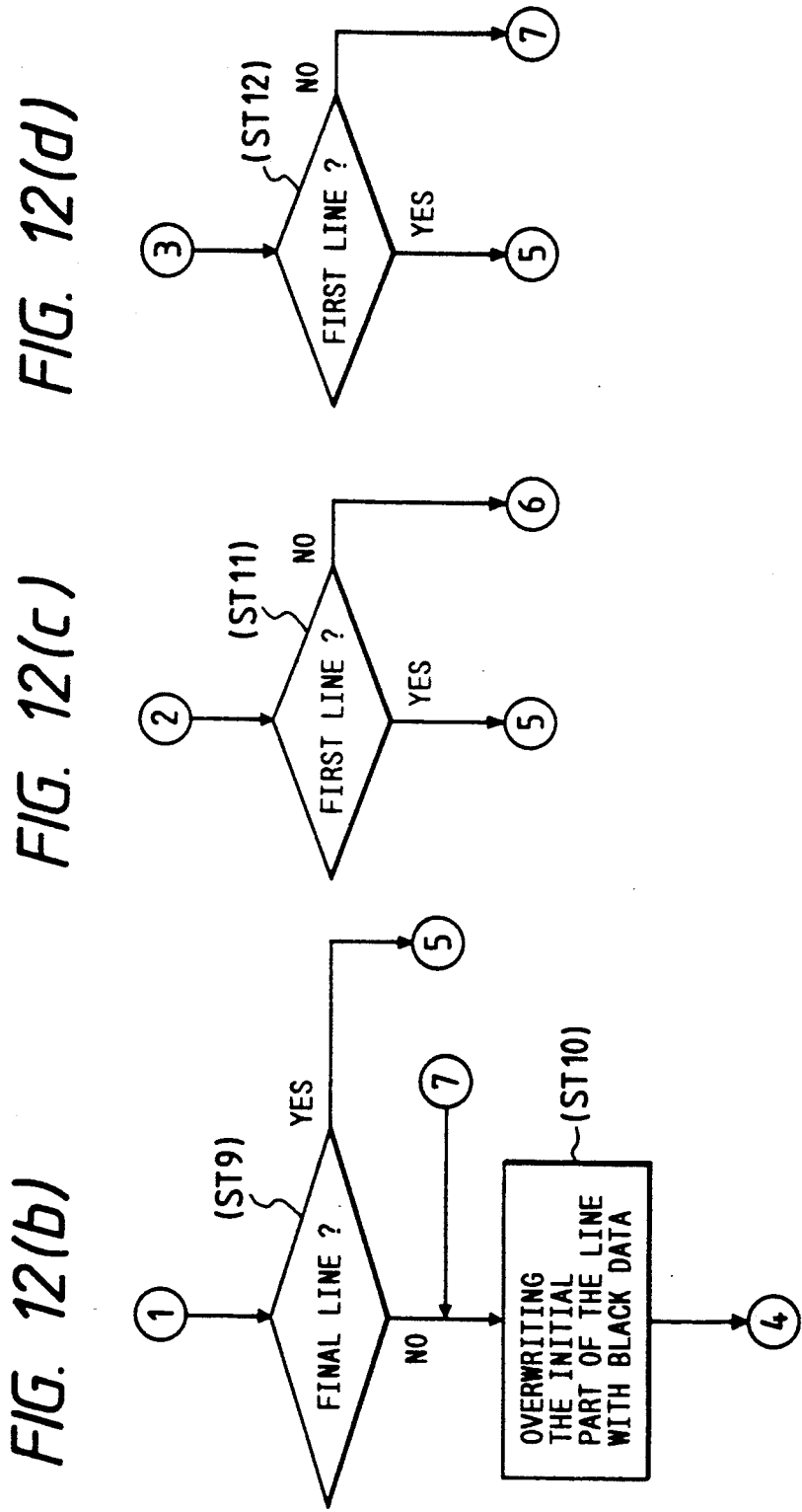

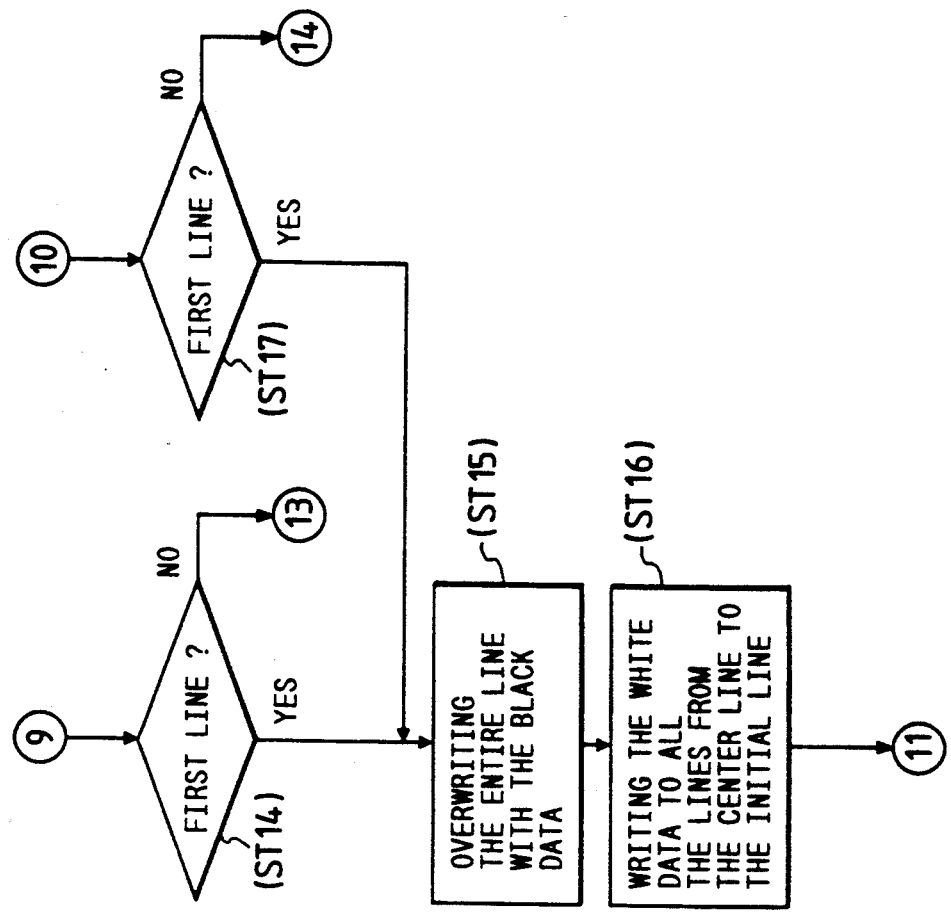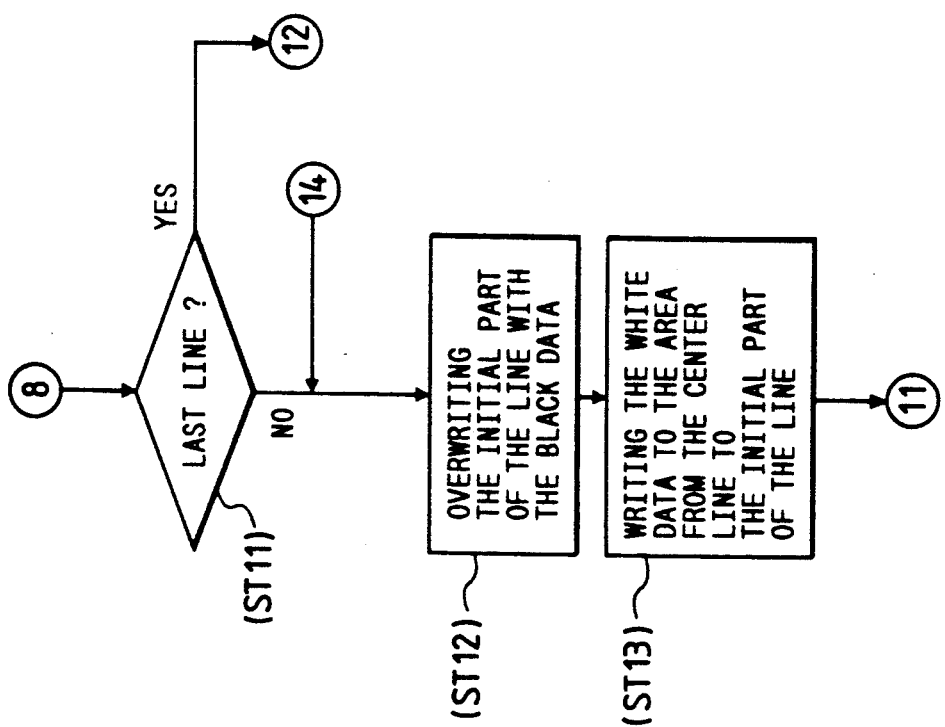

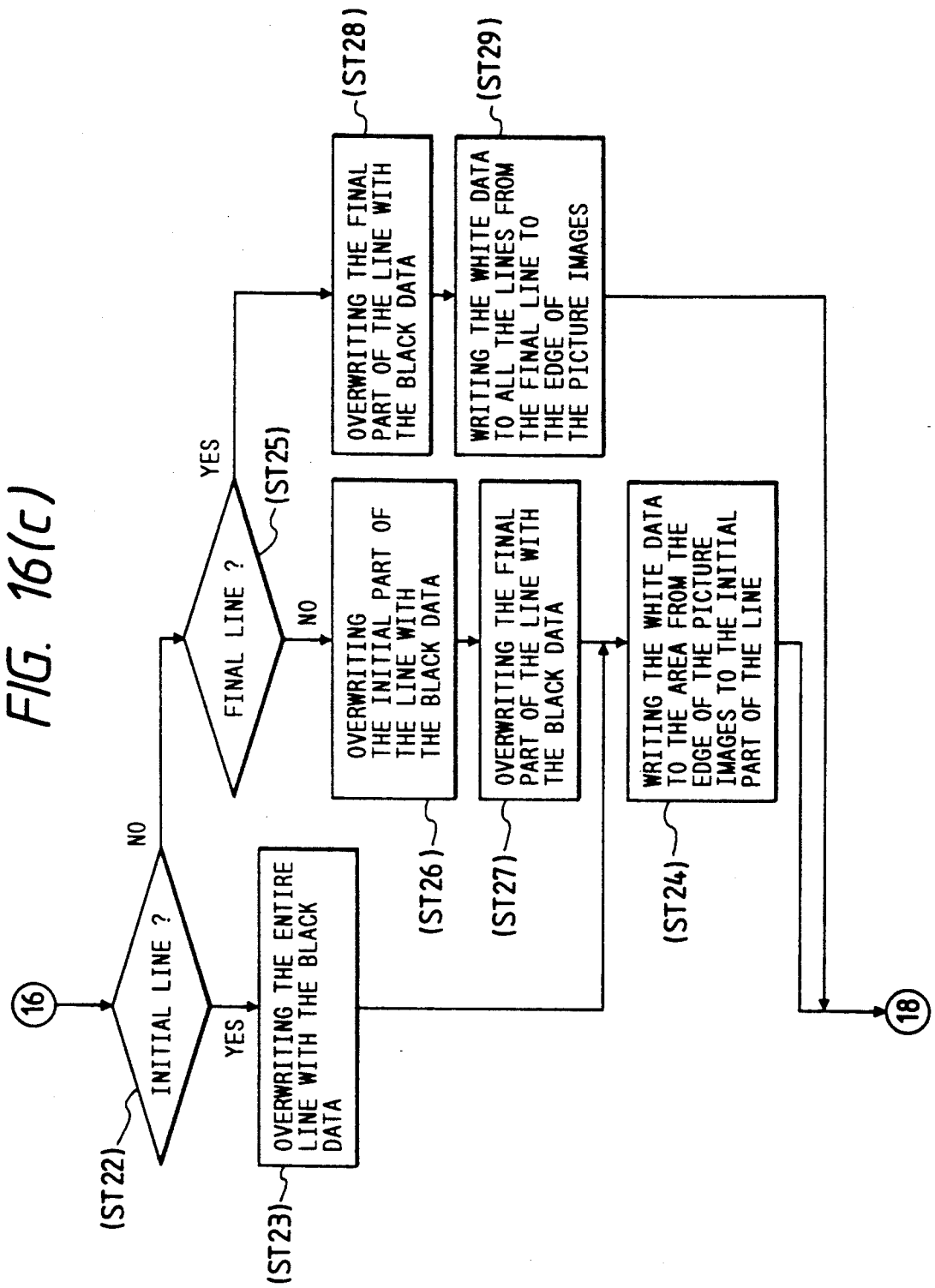

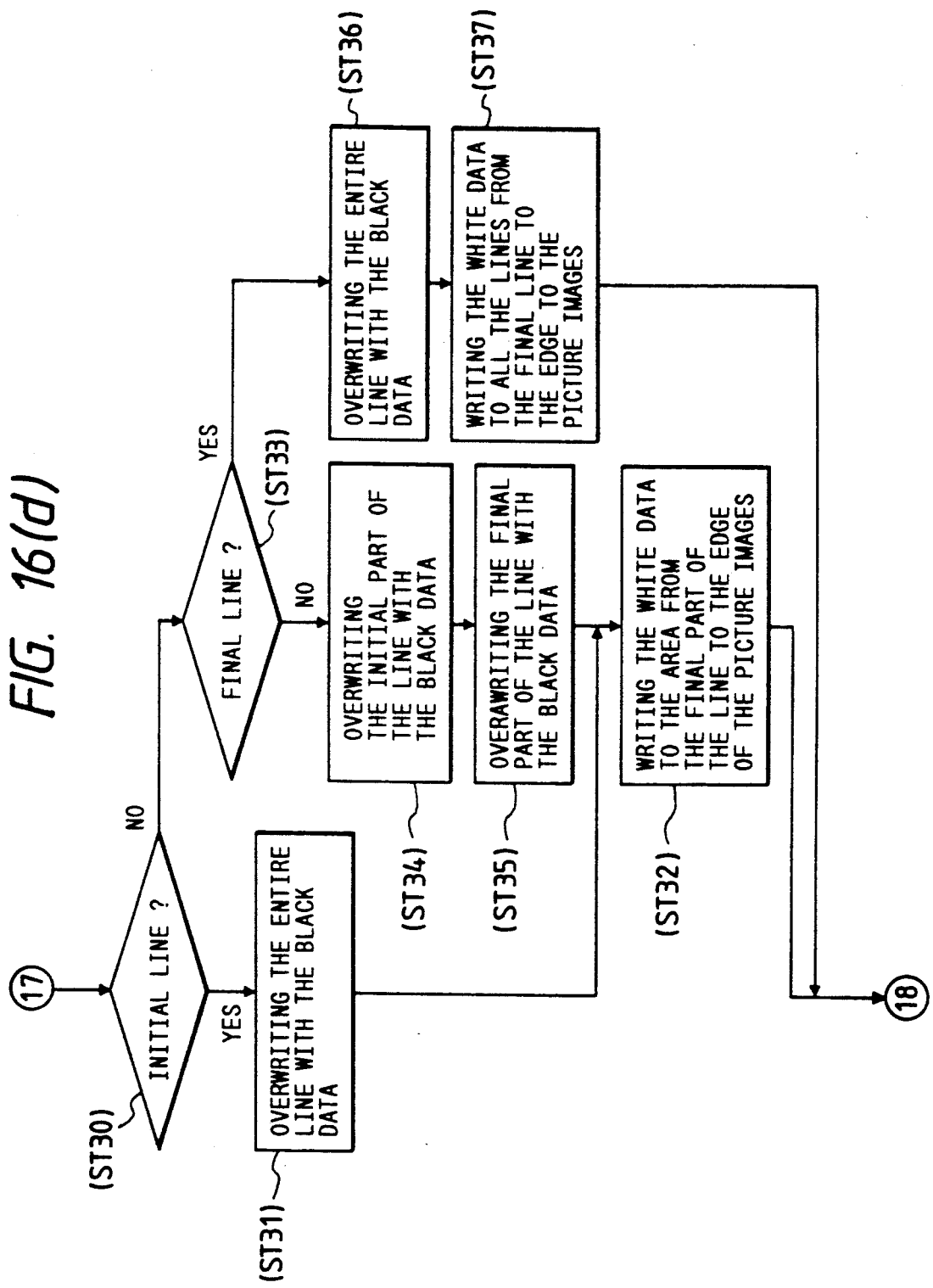

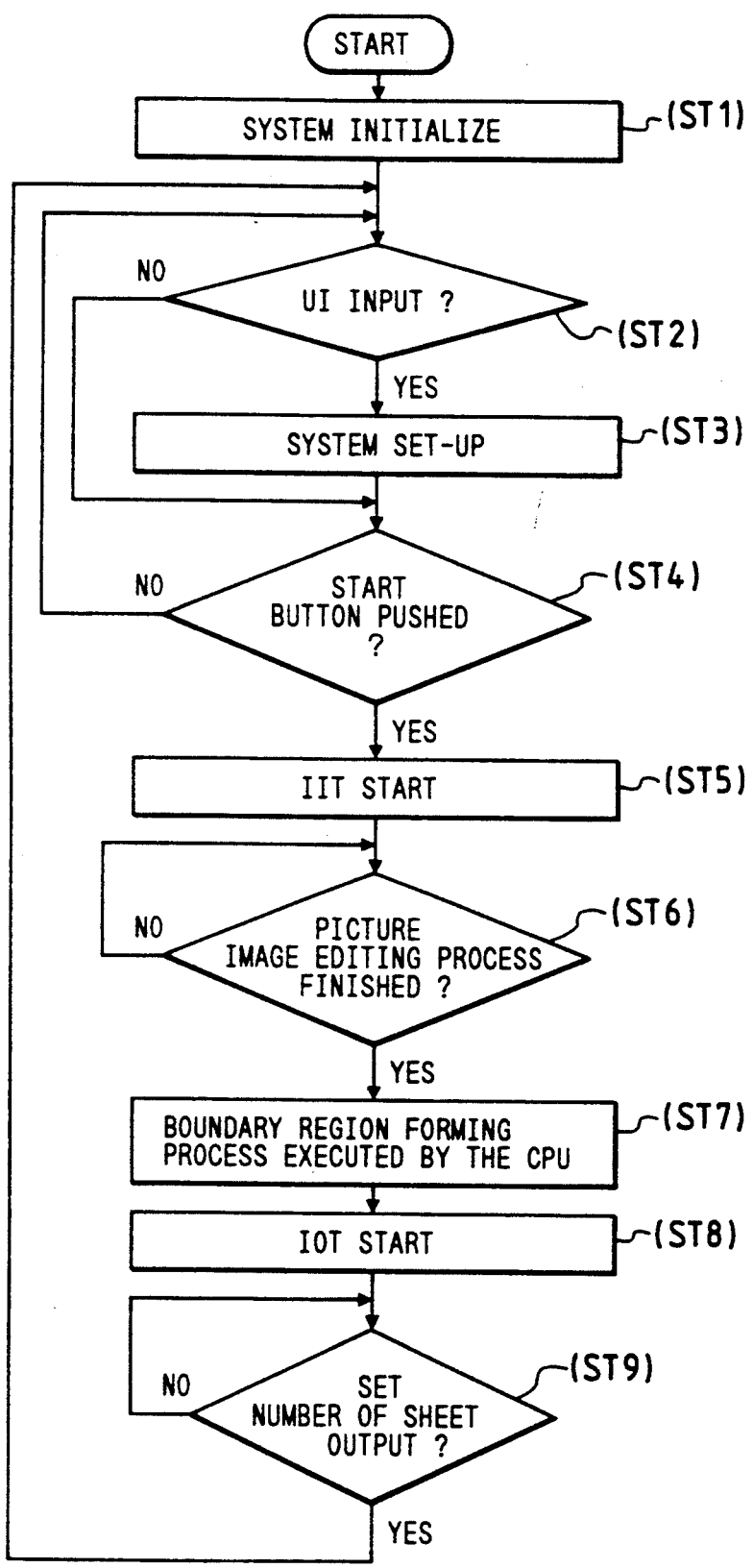

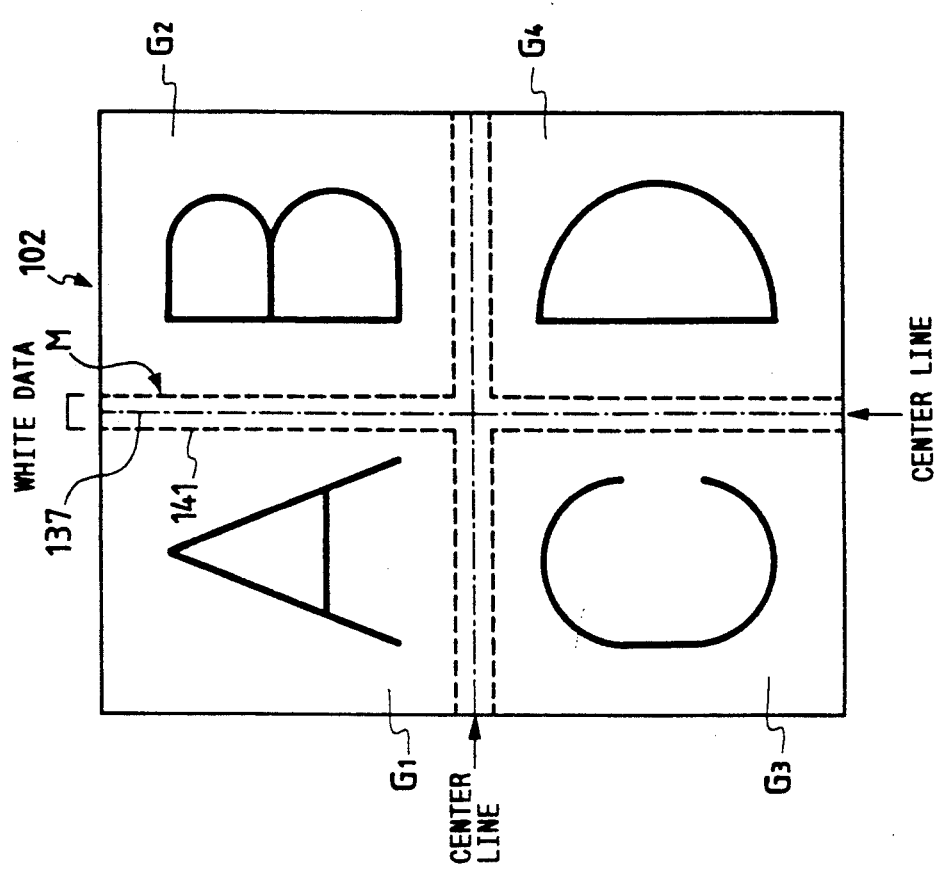
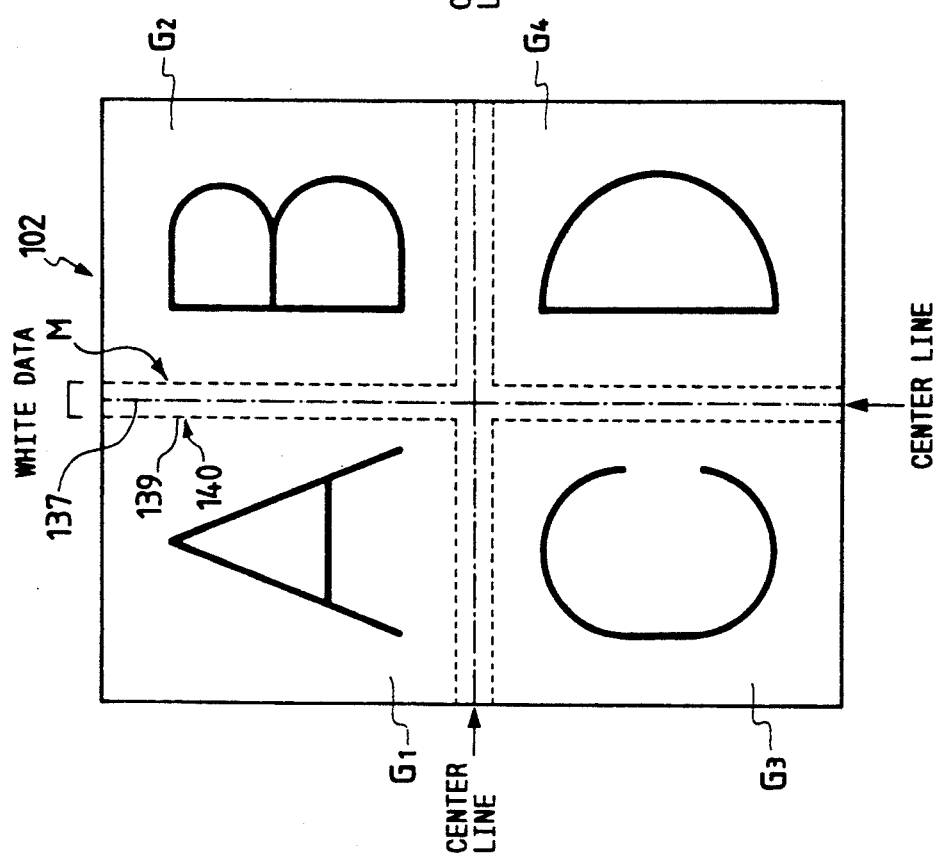

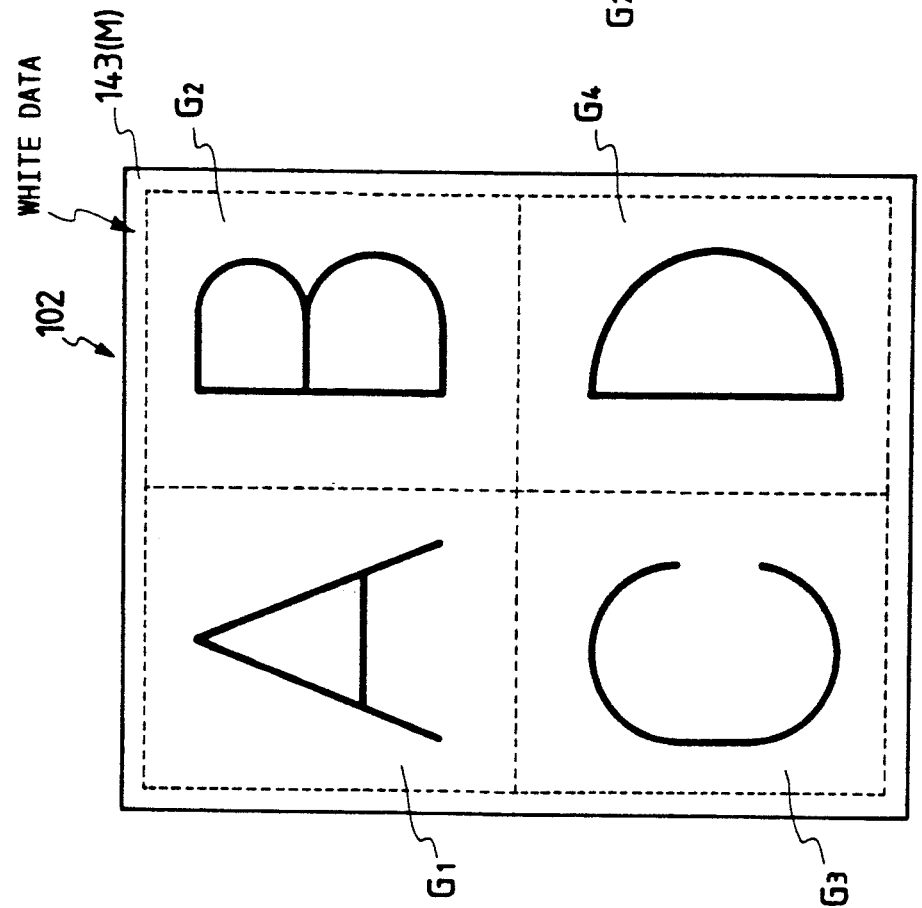

PICTURE IMAGE EDITING SYSTEM FOR FORMING BOUNDARIES IN PICTURE IMAGE DATA IN A PAGE MEMORY DEVICE

FIELD OF THE INVENTION

The present invention relates to a picture image editing system and more particularly to improvements on a picture image editing system designed to be capable of forming single-page picture image data in a page memory device by editing a plurality of sets or groups of picture image data input from an input unit, and then furnishing such picture image data edited in a single page format to picture image output equipment.

DISCUSSION OF THE RELATED ART

Generally, picture image editing systems which are designed to edit the picture image data input from a picture image input device into a page memory and to output the edited picture image data to a picture image output device are known among the existing picture image editing systems.

Some of these conventional picture image editing systems are provided with the function of editing a plurality of sets or groups of picture image data to form composite picture images. In a picture image editing system of this type, the method employed, for example, in the editing of a plurality of sets or groups of picture image data G (specifically, $G_1$, $G_2$, $G_3$, and $G_4$) to form composite picture image data in a page memory 200, as shown in FIG. 35, ordinarily consists of merely arranging the picture image data in the individual sets (specifically, $G_1$, $G_2$, $G_3$, and $G_4$) to be written into the corresponding areas in a page memory 200.

However, with such picture image editing systems as the one just mentioned, the demarcating areas (as shown by the middle dotted lines in FIG. 35) between the individual sets or groups of picture image data G will not be rendered perceptibly when the composite picture image data are output to a picture image output device (for example, a printer). Accordingly, such a picture image editing system has a technical disadvantage in that it is hard to perform subsequent processes on the output picture images, such as cutting the printed composite picture images into parts corresponding to the individual picture image data sets G or bending the printed sheet. The system also presents another technical disadvantage in that it is difficult to perform such processes as extraction of a given picture image or replacement of a given picture image with another when additional editorial work and other processes are to be performed on the composite picture image data G which is being fed into a workstation or a personal computer system.

Moreover, such a conventional picture image editing system has an additional technical disadvantage in that it is difficult to secure a folding margin, a cut-off margin, or a pasting margin, etc., causing difficulties in the execution of the subsequent processes. The boundary regions of the individual sets of picture image data will be in contact with one another on the output of a picture image output system if the black data of the edited picture images are present at points close to the demarcating area. Additionally, in proportion to the excessive closeness of the picture image data of the different sets, it is increasingly difficult to perform processes such as extraction of a given picture image or replacement of a given picture image with another when further editorial work and other processes are to be performed on the composite picture image data G, being fed into a workstation or a personal computer system.

Furthermore, such a conventional picture image processing system causes another technical disadvantage in that the quality of the composite picture images produced with such a series of efforts will be deteriorated due to a frame deleting operation which is performed on the picture images by the picture image output device. When the composite picture images produced by the editing operations are output with a picture image output device, the frame deleting operation is necessary, because, in the course of producing the composite picture image data, the conventional process merely arranges the picture image data of the individual sets G without any particular attention paid to the demarcating areas of the sets of picture image data.

SUMMARY OF THE INVENTION

Objects of the Present Invention

The present invention has been made in view of the above circumstances and has as an object to provide a picture image editing system capable of performing a prescribed boundary processing operation on the demarcating areas of the individual sets of the picture image data, whereby the plurality of sets of picture image data are edited into composite picture image data in a single page format and output to a picture image output device, thereby making it possible to perform the subsequent processing operations in a simple and easy manner on the composite picture images thus output from such a picture image output device.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

In order to achieve the objects set forth hereinabove and in accordance with the purpose of the invention as embodied and broadly described herein, a picture image editing system constructed in accordance with the present invention comprises receiving means for receiving picture image data, a page memory device, editing means for designating areas of the page memory device as demarcating areas, for forming a plurality of sets of picture image data in the page memory device and for storing the sets of picture image data into the page memory device as composite picture image data in a single page format, and means for forming boundaries in the composite picture image data by writing desired boundary region data into the page memory in at least some of the demarcating areas.

BRIEF DESCRIPTION OF THE DRAWINGS

The accompanying drawings, which are incorporated in and constitute a part of this Specification illustrate embodiments of the present invention and, together with the description, serve to explain the objects, advantages and principles of the invention.

In the drawings:

FIG. 1(*b*) illustrates the operation of the picture image editing system of FIG. 1(*a*);

FIG. 12(a) through FIG. 12(d) are flow charts respectively illustrating the interrupt processing routine (1) by the EOL (end-of-line) interrupt;

FIG. 15(a) through (c) are flow charts respectively illustrating the interrupt processing routine (2) by the EOL (end-of-line) interrupt;

FIG. 17 is a flow chart illustrating an example of a modification of the picture image editing process;

FIG. 19 through FIG. 31 illustrate some examples of the reverse posterization process which can be realized in the cited example of preferred embodiment;

FIG. 32 through FIG. 34 illustrate some examples of the cut and paste process which can be realized by the cited example of preferred embodiment.

Figure 1A:
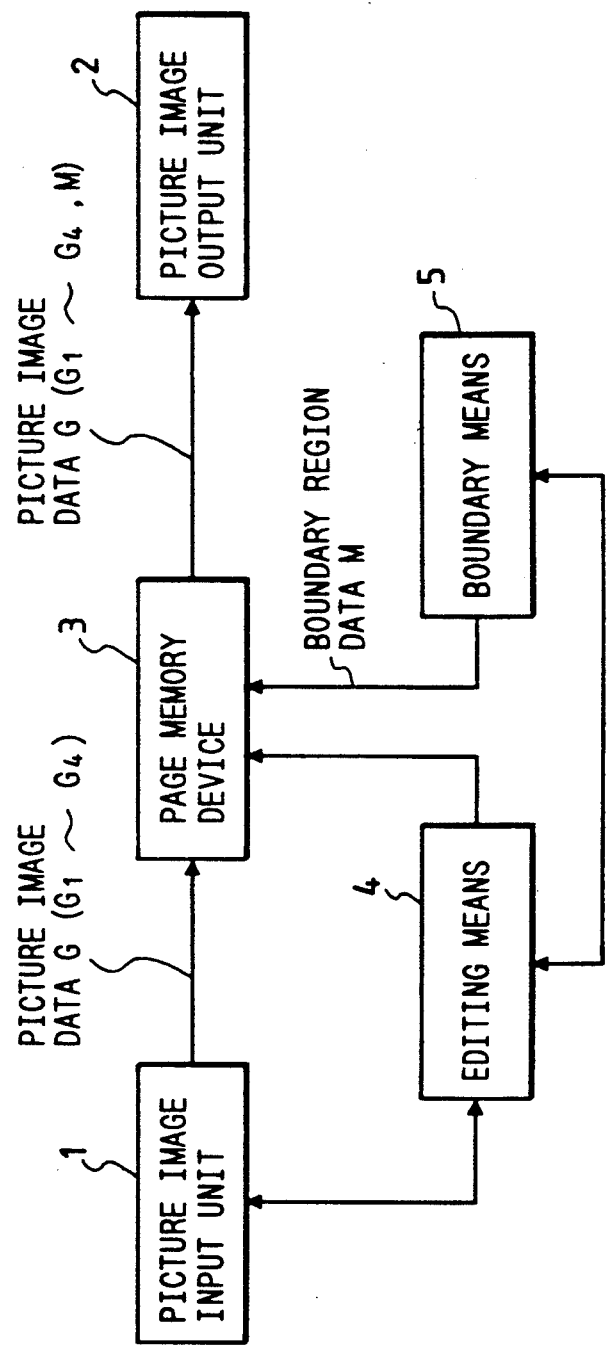
FIG. 1(*a*) illustrates an outline of the picture image editing system constituting a preferred embodiment of the present invention.

In the drawings mentioned above, the following reference characters indicate the following items:

G ($G_1$ through $G_4$) . . . Picture image data
M . . . Boundary region data
1 . . . Picture image input unit
2 . . . Picture image output unit
3 . . . Page memory device
4 . . . Multiple system picture image editing means
5 . . . Boundary region forming means

DETAILED DESCRIPTION OF THE PREFERRED EMBODIMENT

Now, the present invention will be described in detail on the basis of an example of its preferred embodiment as illustrated in the accompanying drawings, in which like reference characters designate like or corresponding parts throughout the several drawings.

Table of Contents

I. Introductory Description of this Picture Image Editing System
II. Picture Image Input Unit
III. Picture Image Output Unit
IV. User Interface
V. Picture Image Editing System
    (1) Basic configuration
    (2) Direct Memory Access Control System (DMAC)
    (3) Outline of picture image editing process
    (4) Reverse posterization process
        (4-a-1) Basic processing operations for picture image editing
        (4-a-2) Interrupt processing routine (1) (Black data boundary region forming process)
        (4-a-3) Example of picture image output
        (4-a-4) Example of modified black data boundary region forming process
        (4-b-1) Interrupt processing routine (2) (Inner frame setting boundary region forming process)
        (4-b-2) Example of modified inner frame setting boundary region forming process
        (4-a-1) Interrupt processing routine (3) (Outer frame setting boundary region forming process)
        (4-c-2) Example of modified outer frame setting boundary region forming process
    (5) Cut and paste process
    (6) Example of modified picture image editing process
VI. Summary

I. Introductory Description of This Picture Image Editing System

Figure 2:
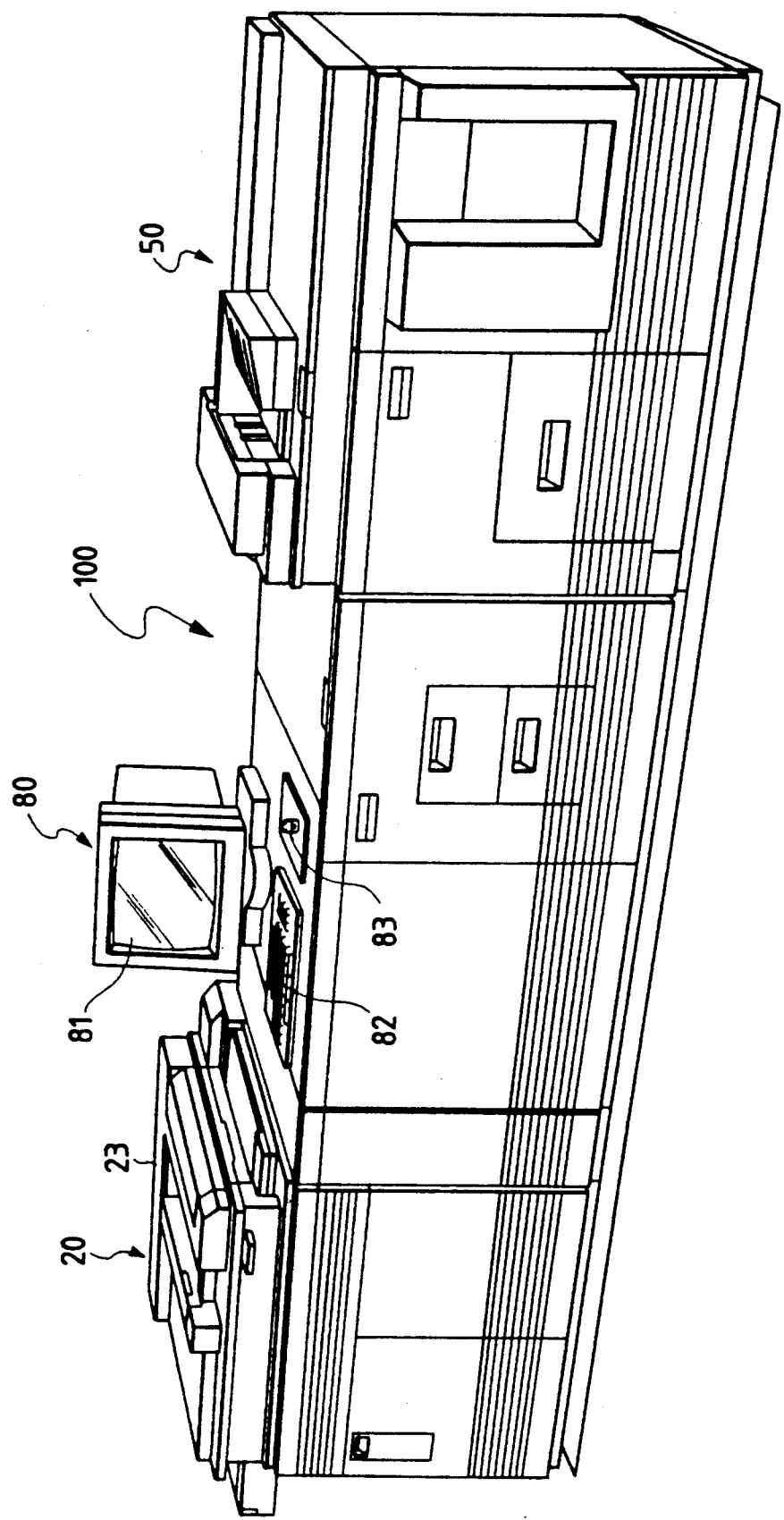
FIG. 2 is a perspective view illustrating the external appearance of a digital electro-photographic copying machine according to an example of preferred embodiment of the present invention.

FIG. 2 is an overall perspective view illustrating a digital electro-photographic copying machine which constitutes an embodiment of the present invention. This copying machine is provided with a picture image input unit 20, which reads an original document and converts the information thus read into digital picture image data, a picture image editing unit 100, which takes such pictures image data from the picture image input unit 20 and performs editing jobs on the picture image data according to a desired editing mode, a picture image output unit 50, which performs printing jobs by the electro-photographic process on the basis of the picture image data from this picture image editing unit 100, and a user interface 80, with which the user gives instructions on the picture image editing mode, requests display of the contents of a copying job, and checks the contents of the picture image data to be printed. The digital electro photographic copying machine cited in this example of preferred embodiment according to the present invention is capable of displaying such functions for printing out a plurality of picture images on a single sheet of paper as reverse posterization and "reduced-scale integrated single sheet copying function." The latter function specifically consists in reading a plurality of sheets of an original document on a reduced scale with the picture image input unit 20 and producing the output of the picture images of those sheets integrated into their orderly arrangement in regular sequence on a sheet of paper in a specified size. The functions also include the so-called "cut and paste" function, which consists of composing synthesized picture image data on a single sheet by setting the second or the n-th picture image which is input from the picture image input unit 20 in the first picture image which was input earlier from the picture image input unit 20.

II. Picture Image Input Unit

Figure 3:
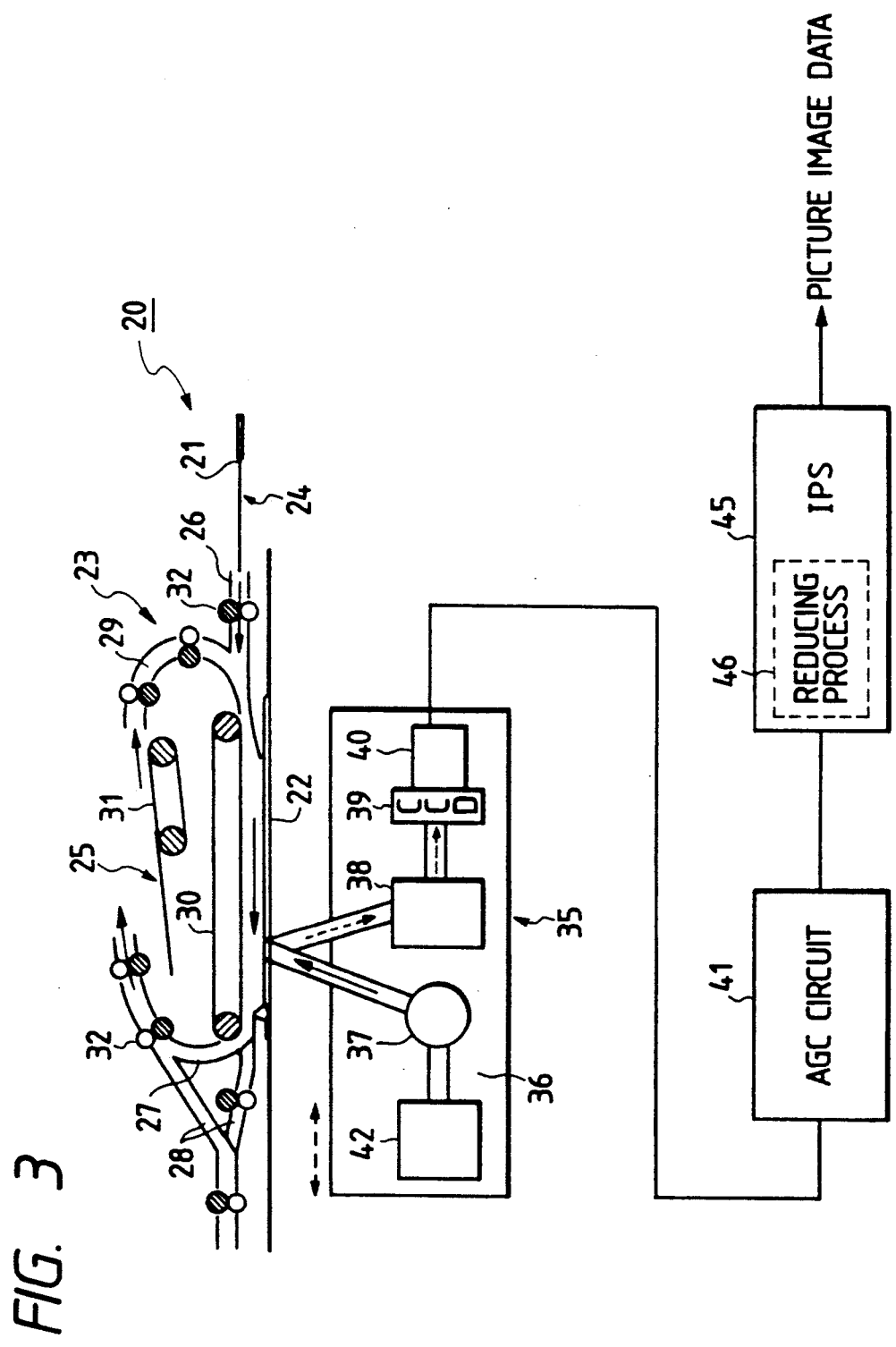
FIG. 3 illustrates a picture image input unit according to the same example of preferred embodiment of the present invention.

As shown in FIG. 2 and FIG. 3, the picture image input unit 20 is provided with: a double sided automatic document feeder 23 (which is hereinafter referred to as "Duplex Automatic Document Handler; DADH"), which automatically feeds the sheets of an original document 21 in regular sequence onto the platen 22, a Raster Input Scanner 35 (hereinafter called by the abbreviated name, "RIS"), which reads the original document 21 on the platen 22 at the image density of 400 dpi, and a picture image processing module 45, which performs various types of processing operations (such as the so-called shading correction, ghost correction, and undercoat color removal) and various editing jobs (such as enlargement and reduction, oblique styling, halftone mesh pattern overlay, outline, cubic character formation with partial shading, and so forth) on the picture image data DT from the RIS 35 as desired from time to time.

DADH (Duplex Automatic Document Handler)

In this example of preferred embodiment, the DADH 23 mentioned above is constructed with an original document feeding path 26, which leads from the original document setting position 24 to the area above the platen 22, an original document feedback path 27, which leads from the platen 22 to the original document recovering position 25, an original document reversing feedback path 28, which feeds the original document 21 with its face reversed back to the platen 22, an original document refeeding path 29, which leads from the original document recovering position 25 to the platen 22 for feeding the original document again, a document transport 30, which transports the original document 21 from the original document feeding path 26 and from the original document refeeding path 29 to the area above the platen 22, transport rolls 31, which are provided as appropriate in the individual original document feeding paths 26 through 29, and a transport belt 30. Then, for the feeding of an original document 21 with picture images printed on one face, the original document feeding paths 26 and 27 will be used. In addition, for an original document 21 with picture images printed on both of its faces, the original document feeding paths 26 and 28 are first used, and then the original document feeding paths 29 and 27 are used.

RIS (Raster Input Scanner)

The RIS 35 mentioned above has a scanning carriage 36, which moves in one direction of the platen 22 and is mounted with a fluorescent lamp 37 for its scanning operations. With these, the RIS 35 is constructed in such a manner as to irradiate a beam of light from this fluorescent lamp 37 onto the original document 21 positioned on the platen 22, while moving in the prescribed direction, and to lead the reflected light as appropriate, by way of an optical system 38, to an image sensor 39 (a CCD (Charge Coupled Device) is used in this example of preferred embodiment). Then, the picture image data read by the image sensor 39 are fed out through a sensor interface 40 to an automatic gain control circuit 41, which makes an adjustment of the picture image data, as appropriate, and then feeds the adjusted picture image data to the picture image processing module 45.

In this regard, the reference number 42 in FIG. 3 indicates a lamp heater which controls the temperature of the fluorescent lamp 37.

Picture Image Processing Module

The picture image processing module 45 is provided, for example, with a reducing process section 46. This reducing process section 46 performs a conversion of picture image data on an equal scale to the original document as read with the RIS 35 into reduced-scale picture image data by thinning out the pixels as appropriate on the basis of a prescribed reduction ratio.

III. Picture Image Output Unit

Figure 4:
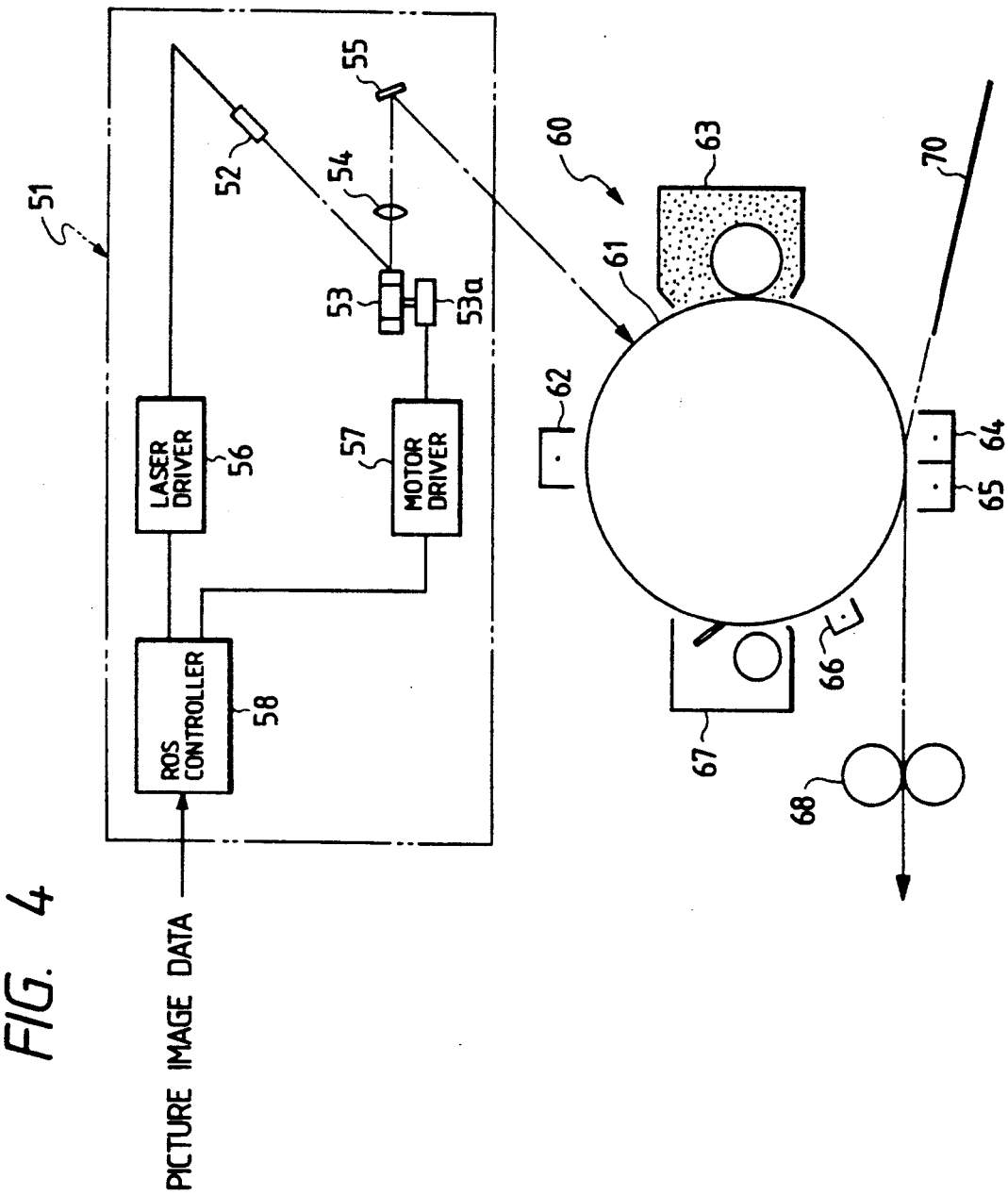
FIG. 4 illustrates a picture image output unit according to the same example of preferred embodiment of the present invention.

As shown in FIG. 2 and FIG. 4, the picture image output unit 50 is provided with a Raster Output Scanner 51 (which is hereinafter called "ROS"), which forms optical picture images on the basis of the picture image data fed from a picture image editing system 100, a printing module 60, which forms latent images by an electro-photographic process in correspondence with the optical picture images generated by the ROS 51 mentioned above and thus turns such latent images into visible picture images on recording paper, and a paper feeding device (not illustrated in these Figures), which feeds the recording paper to the printing module 60 in synchronization with the timing for the writing operations performed by the ROS 51 mentioned above.

ROS (Raster Output Scanner)

In FIG. 4, an ROS controller 59 sends out prescribed control signals to a laser driver 56, and a motor driver 57 on the basis of the picture image data transmitted from the picture image editing system 100. The motor driver drives a driving motor 53a for a polygon mirror 53 which polarizes a beam from a semiconductor laser unit 52 driven by the laser driver 56. Then, an image forming lens 54 forms images of the beam along the scanning line on a photosensitive drum 61, by the way of a reflecting mirror 55, which conducts the beam of light to the position of a scanning line on the photosensitive drum 61.

Printing Module

In FIG. 4 cited above, photosensitive drum 61, around which a photosensitive material layer with optical sensitivity and electrical conductivity is formed, is given preparatory charging by an electric charging Corotron 62. A developer 63 develops in toner the latent images (negative latent images, in which the picture image area has an electrical potential level lower than the electrical potential level in the background area, or positive latent images, in which the picture image area has an electrical potential level higher than that of the background area) as written by the ROS 51 to the area on the photosensitive drum 61. An image transfer Corotron 64 charges the printing paper 70 fed from the paper feeding device and transfers the toner images on the photosensitive drum 61 onto the printing paper thus charged. After the image transfer process is finished a separating Corotron 65, separates the printing paper 70 from the photosensitive drum 61. A discharging Corotron 66, then eliminates the residual electric charge from the area on the photosensitive drum 61, and a cleaner 67, removes the residual toner left over on the photosensitive drum 61. Finally, a thermal fixing type fuser 68 (fixing device) performs the fixation of the toner images transferred onto the printing paper 70, applying a heating process to the images.

IV. User Interface

In FIG. 2, the user interface 80 is provided with a cathode ray tube (CRT) display unit 81, which displays the edited picture images and the job programs, a control board 82, which is used for giving instructions with respect to such items as the picture images for editing, and a mouse 83, which indicates a display position on the CRT display unit 81.

v. Picture Image Editing System

V-(1) Basic configuration

Figure 5:
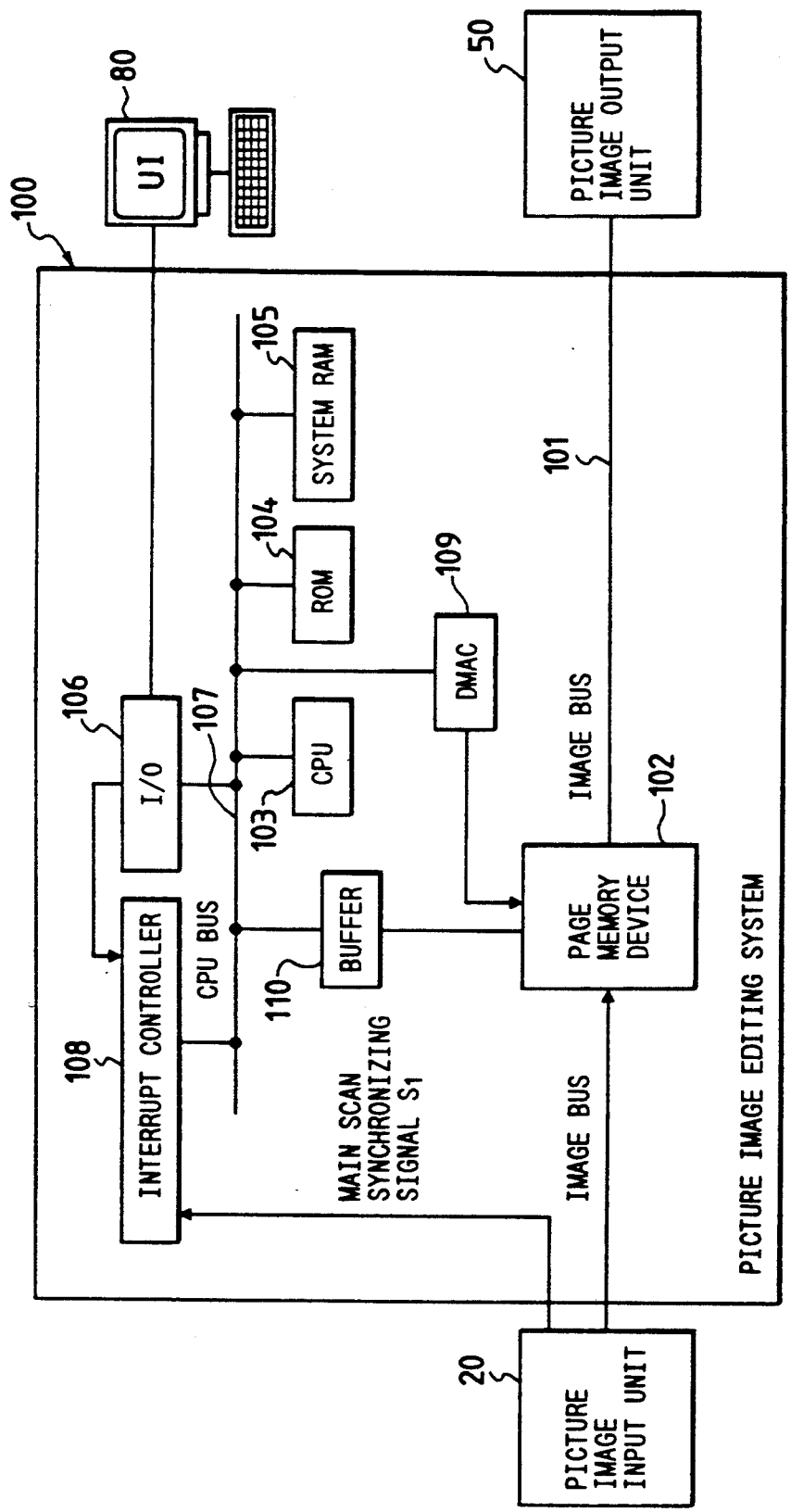
FIG. 5 is a block diagram illustrating the picture image editing system according to the same example of preferred embodiment.

As shown in FIG. 5, the picture image editing system 100 is provided with a page memory device 102, which is connected via an image bus 101 to the picture image input unit 20, a Central Processing Unit (CPU) 103, which performs the centralized control of the picture image editing jobs, the copying jobs, and so forth, a read only memory device (ROM) 104, in which the picture image editing programs, the copying job programs, and so forth are stored in advance, a system random access memory device (RAM) 105, which temporarily stores the data on the processing operations performed by the CPU 103, I/O ports 106 for the picture image input unit 20, the picture image output unit 50, the user interfaces 80, and an interrupt controller 108. Interrupt controller 108 inputs an interrupt signal (an end-of-line signal) EOL, which will be described later, to the CPU 103 via a CPU bus 107 in synchronization with the trailing edge point of the main scanning synchronizing signal S$_1$ issued from the picture image input unit 20. System 100 also includes a Direct Memory Access Controller 109 (which is abbreviated to DMAC), which executes the writing and reading of the picture image data, in place of the CPU 103, directly with the page memory device 102, and a buffer 110, which regulates the transmission of data in the image bus 101 and the CPU bus 107.

V-(2) Direct Memory Access Control (DMAC) system

This DMAC system makes it possible to perform the input of the picture image data in parallel with the output of the picture image data to the page memory device 102. The DMAC System in this example of preferred embodiment is shown in FIG. 6.

Figure 6:
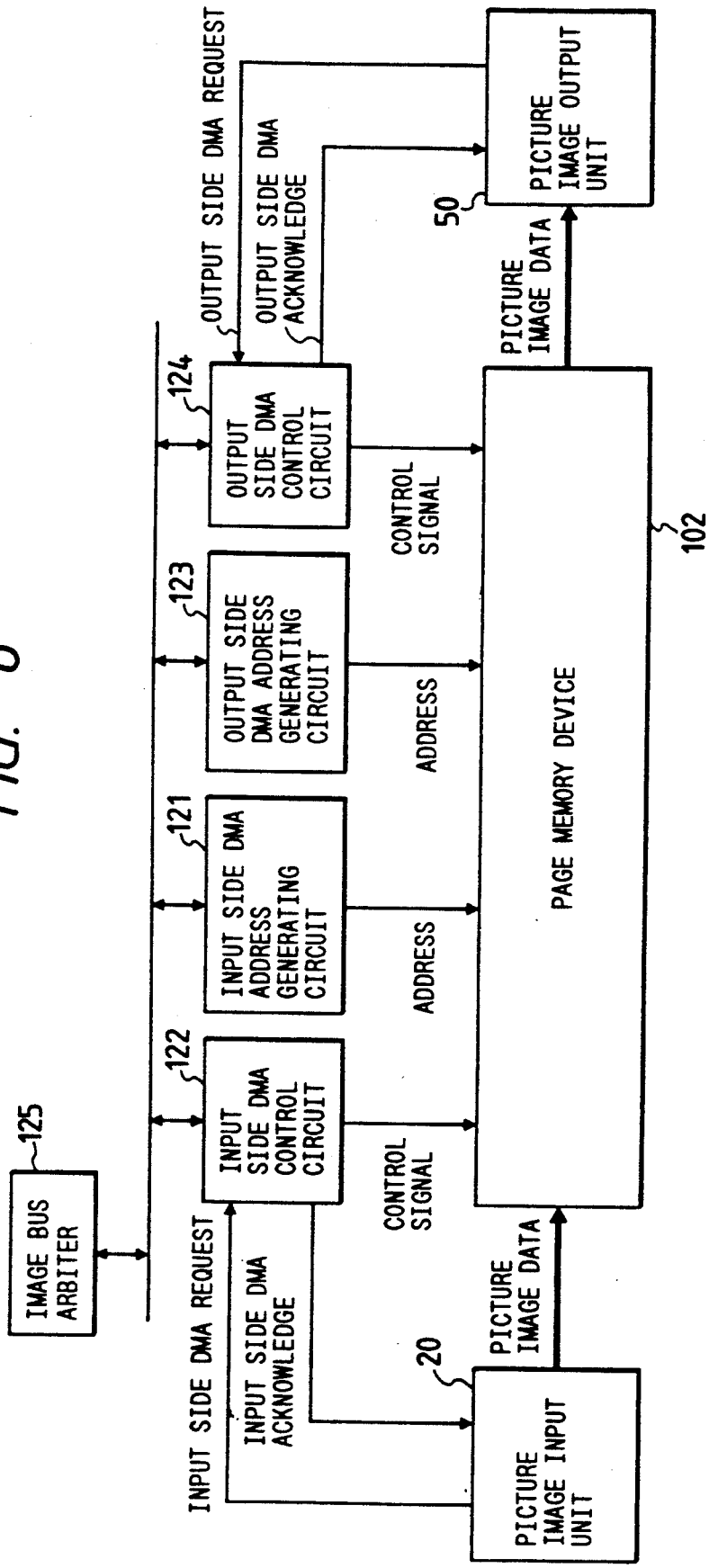
FIG. 6 is a block diagram illustrating the Direct Memory Access Controller (DMAC) according to the same example of preferred embodiment.

In FIG. 6, the input side DMA address generating circuit generates the address for the destination to which the input picture image data are to be re-transmitted. An input side DMA control circuit 122, which is composed of a Programmed Logic Device (PLD), generates a request signal for reading access to be made to the page memory device 102, and also sends out the prescribed control signal to the page memory device 102 at the point in time when a request for the input of the picture images is made after this device has finished exchanges of a command status relating to whether or not any requests for the input of the picture images have been made between the device and the picture image input unit 20.

An output side DMA address generating circuit generates the address for a destination for re-transmitting the picture image data. An output side DMA control circuit 124, which is composed of a programmed logic device (PLD) in the same way as the input side DMA control circuit 122, generates a request signal for read out access to be made from the page memory device 102, and also sends out the prescribed control signal to the page memory device 102 at the point in time when a request for the output of picture images is made after this device has finished the exchanges of a command status relating whether or not any request for the output of the picture images have been made between the device and the picture image output unit 50.

An Image Bus Arbiter 125, arbitrates the various kinds of accesses to the page memory device 102 in accordance with the predetermined order of priority. When a request signal is input from either the input side DMA control circuit 122 or from the output side DMA control circuit 124, Image Bus Arbiter 125 accepts either one of the requests on the basis of the priority just mentioned. Then, the Image Bus Arbiter 125 causes whichever one of the input side DMA control circuit 122 and the output side DMA control circuit 124 corresponds to the accepted request signal to generate a prescribed control signal.

V-(3) Outline of Picture Image Editing Process

Figure 7:
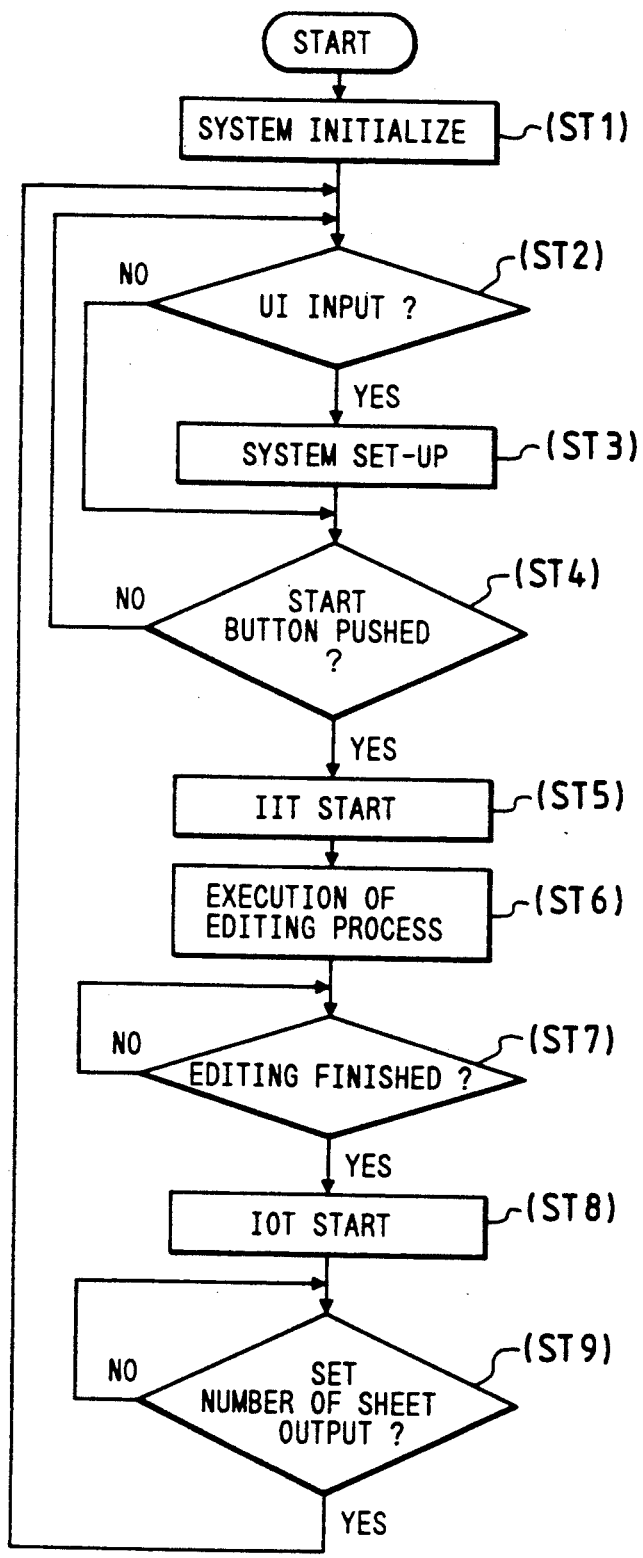
FIG. 7 is a flow chart illustrating the overall sequence of the picture image processing operations performed by the picture image editing system according to the preferred embodiment.

FIG. 7 is a flow chart illustrating the overall sequence of the picture image processing operations performed by the picture image editing system in this example of preferred embodiment of the present invention.

In FIG. 7, the CPU 103 first performs system initializing operations, namely, initialization of the LSI, the Image Input Terminal (IIT), which corresponds to the picture image input unit, the Image Output Terminal (IOT), which corresponds to the image output unit, the DADH, the DMAC 109, and so forth (at the step 1 (the "step" will be hereinafter abbreviated to "ST")). Thereafter, the CPU 103 checks (ST 2) whether or not any input has been made from any user interface, and, provided that an input has been made from the user interface, the CPU 103 performs the set-up of the system. The set-up operations include, for example, the set-up of the number of sheets to be printed and the magnification ratio, the selection of a paper tray, the set-up of the density, and the set-up of an editing mode, which encompasses the set-up of such items as the number of sheets in the original document, the position for setting picture image in composite picture images, the presence or absence, shape, thickness, and position of any boundary line, and the manner of processing the boundaries one being set adjacent to another or otherwise (ST 3).

After this, the CPU 103 checks whether or not the start button has been pushed (ST 4). When the start button has been pushed, the CPU 103 starts the operation of the image input terminal (IIT) (ST 5), thereby executing a series of picture image processing operations of the picture images thus read into the system (ST 6).

Then, the CPU 103 checks whether or not the picture image processing operations have been completed (ST 7), and, when they have been completed, the CPU 103 starts the operation of the image output terminal (IOT) (ST 8). Next, the CPU 103 checks whether or not the picture images have been output in the set number of sheets (ST 9), and, when the picture images have been output in the set number of sheets, the CPU 103 puts the system in a standby state ready for performing the next cycle of picture image processing operations.

V-(4) Reverse Posterization Process

The reverse posterization process performed in this example of preferred embodiment is a process which, for example, is designed to read four sheets of an original document (namely, for four pages) with the picture image input unit 20 at a reduction ratio of 50 per cent, to arrange these reduced picture image data of the four sets $G_1$ through $G_4$ into four blocks for the page memory device 102, to perform the prescribed boundary region forming process (See 3-b-2) to the picture image data, and then to output the processed picture image data in the form of picture images rendered on a single sheet (See FIG. 19 through FIG. 31).

(4-a-1) Basic Processing Operations for Picture Image Editing

The process of the basic operations for the processing of picture images is described below.

Allocation of the Page Memory

Figure 8A:
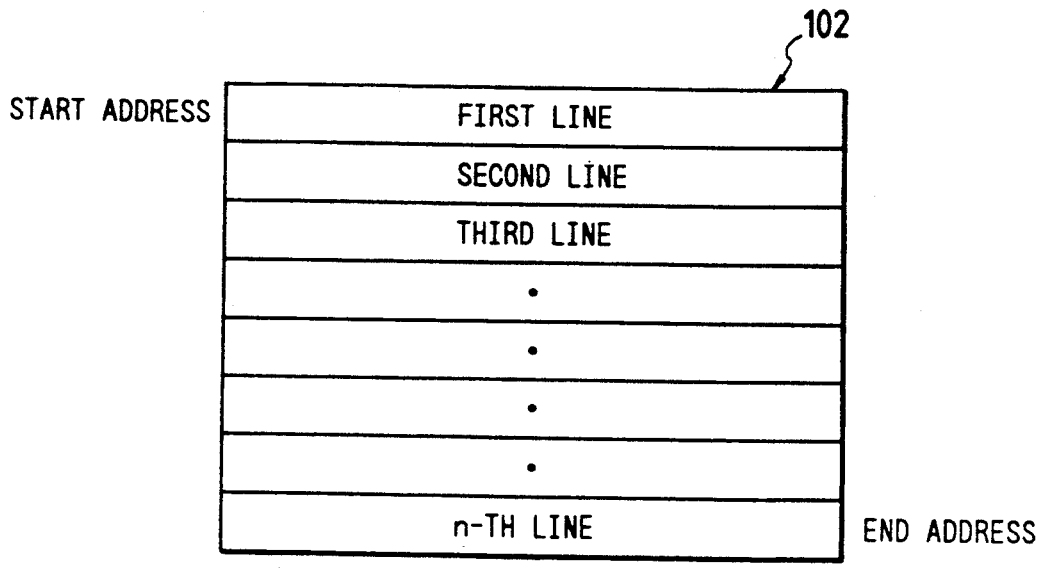
FIG. 8(a) and FIG. 8(b) illustrate allocation of the page memory at the time of reverse posterization.
Figure 8B:
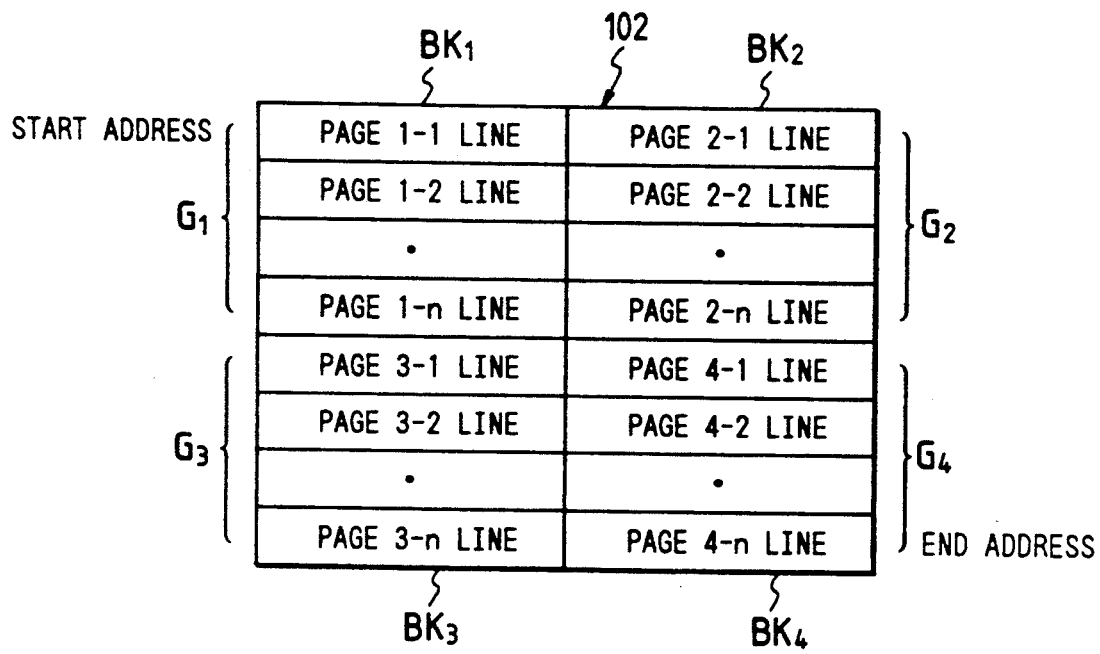

In general, the configuration of a page memory device 102 is such that the picture image data for one page is of n-lines from the start address to the final address, as shown in FIG. 8(a). However, when the process of reverse posterization is to be performed with a reduction by 50 per cent of the picture images from $G_1$ through $G_4$, the page memory device 102 is divided into four blocks, $BK_1$ through $BK_4$, as shown in FIG. 8(b), and the page memory is allocated in such a way as to store the picture image data ($G_1$ through $G_4$) for the individual pages in the individual blocks $BK_1$ through $BK_4$, respectively.

Timing for Writing Picture Image Data to Page Memory

Figure 9A:
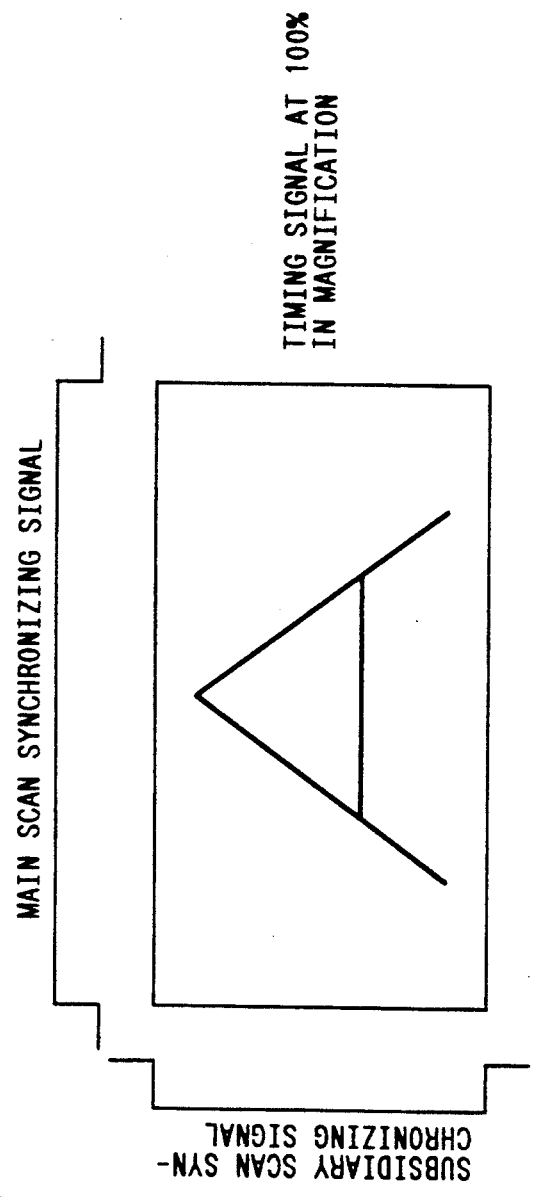
FIG. 9(a) and FIG. 9(b) illustrate timing for writing to the page memory device at the time of reverse posterization.

Generally speaking, the main scan synchronizing signal and subsidiary scan synchronizing signal which are output from the picture image input unit 20 when that unit 20 writes the picture image data for one page (picture images at 100 per cent) to the page memory device 102 will be as illustrated in FIG. 9(a). However, on the occasion when the reverse posterization process is performed (with the picture images $G_1$ through $G_4$ at a reduction ratio of 50 per cent), the main scan synchronizing signal and the subsidiary scan synchronizing signal will respectively be at a timing in which the pulse width is reduced to one half that of the corresponding ordinary synchronizing signals, as shown in FIG. 9(b).

Process for Writing Picture Images to Page Memory

Figure 9B:
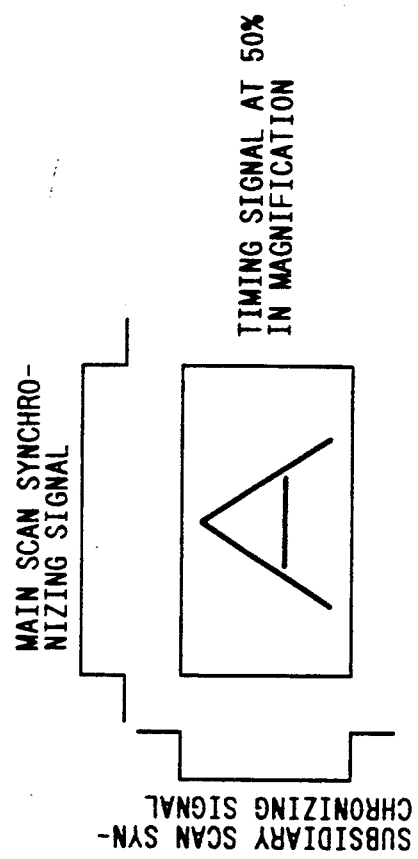
Figure 10:
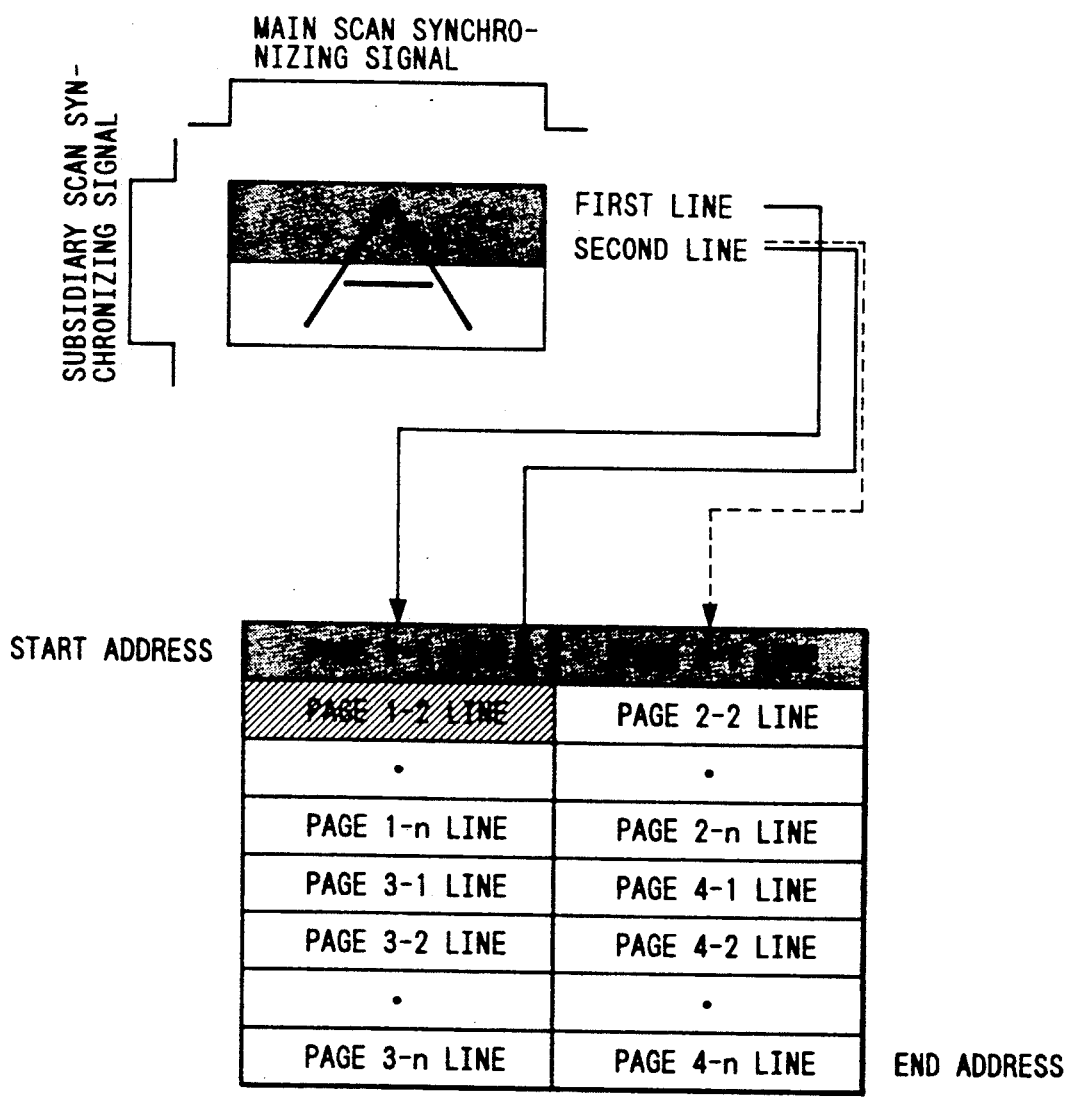
FIG. 10 illustrates operations for writing the picture image data at the time when the picture image data are to be edited.

When picture image data continue to be written with a timing signal as shown in FIG. 9(b) to a page memory 102 in a construction as shown in FIG. 8(b), the second line on the first page may be written in the area where the first line of the second page should properly be written, as shown by the dotted line in FIG. 10.

That is to say, after the first line on the first page is written, the DMAC 109 still holds the address next to the address at which the last data on the first line is written. Thus, if this state is left as it is, the second line of the first page is written to the area where the first line on the second page should properly be written.

Figure 11A:
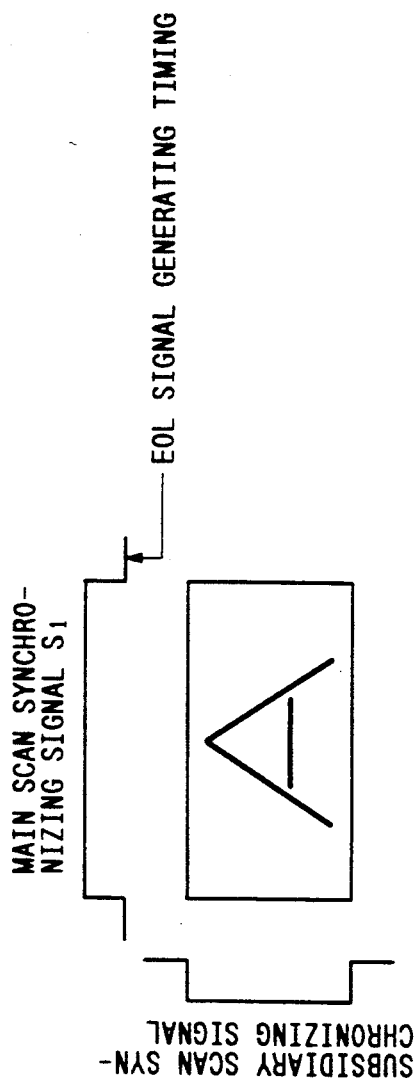
FIG. 11(a) and FIG. 11(b) illustrate the EOL (end-of-line) signal used at the time when picture images are edited.

Therefore, in order to overcome this problem, an interrupt controller 108, which is provided in this example of preferred embodiment as shown in FIG. 11(a), generates and end-of-line (EOL) signal ("end-of-line" is hereafter referred to by the abbreviation, "EOL"), which indicates the end of each scanning line in synchronization with the trailing edge of the main scan synchronizing signal $S_1$ at the stage where the transmission of the picture image data has been completed on each line, and inputs the EOL signal to the interrupt line in the CPU 103.

Figure 11B:
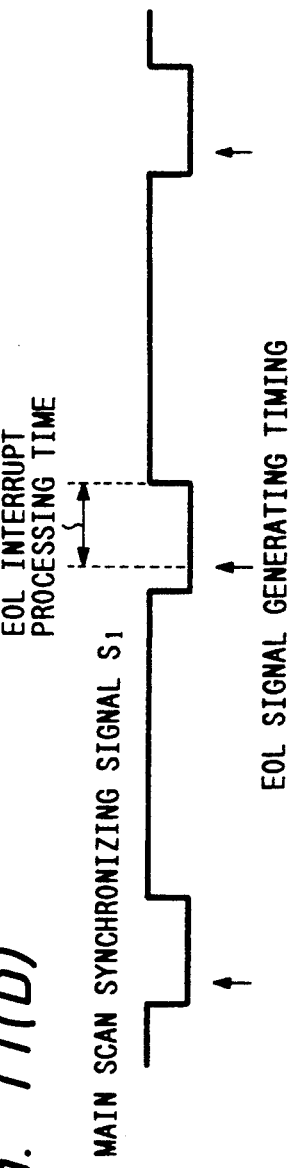
Figure 13A:
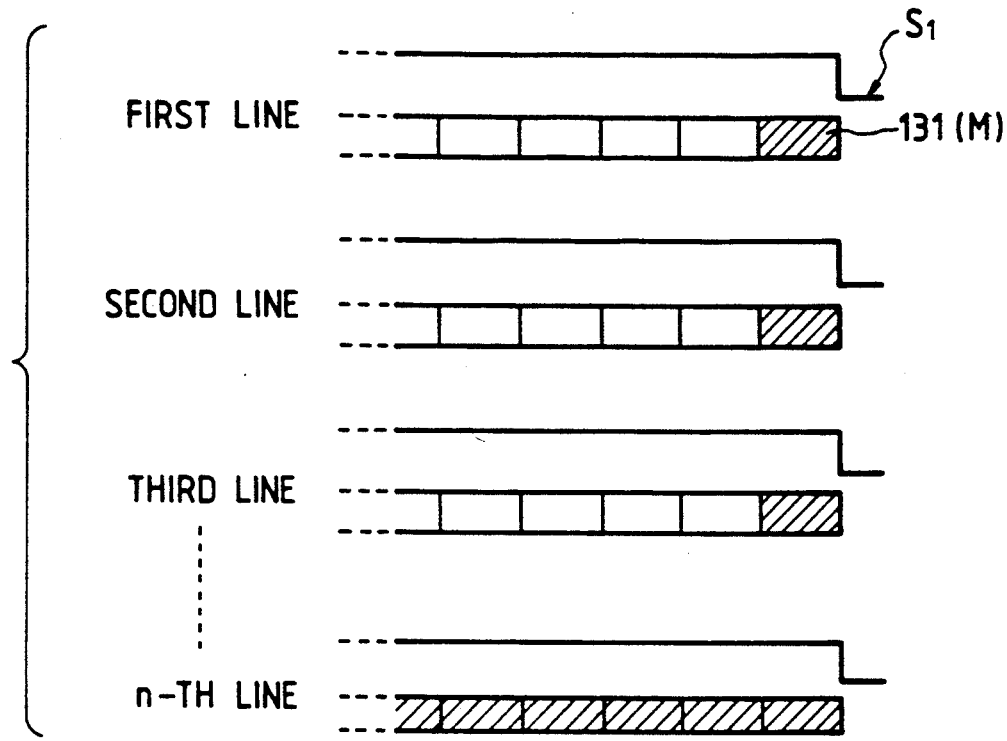
FIG. 13(a) through (d) illustrate the state of the boundary region data written by the interrupt routine (1) for the EOL (end-of-line) interrupt.
Figure 13B:
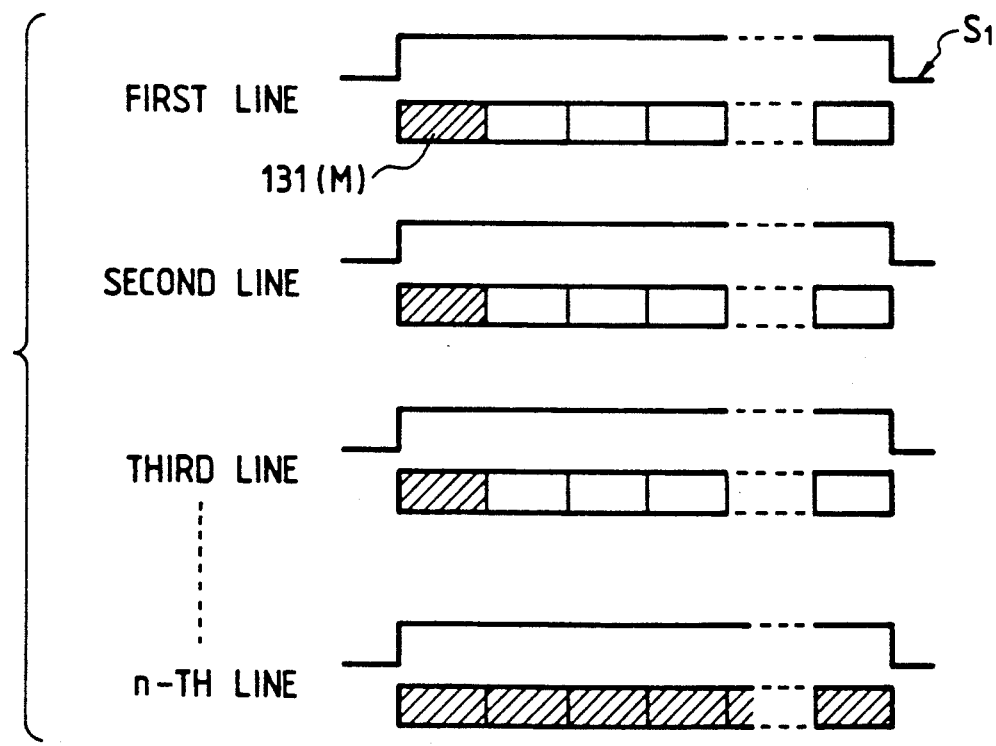
Figure 13C:
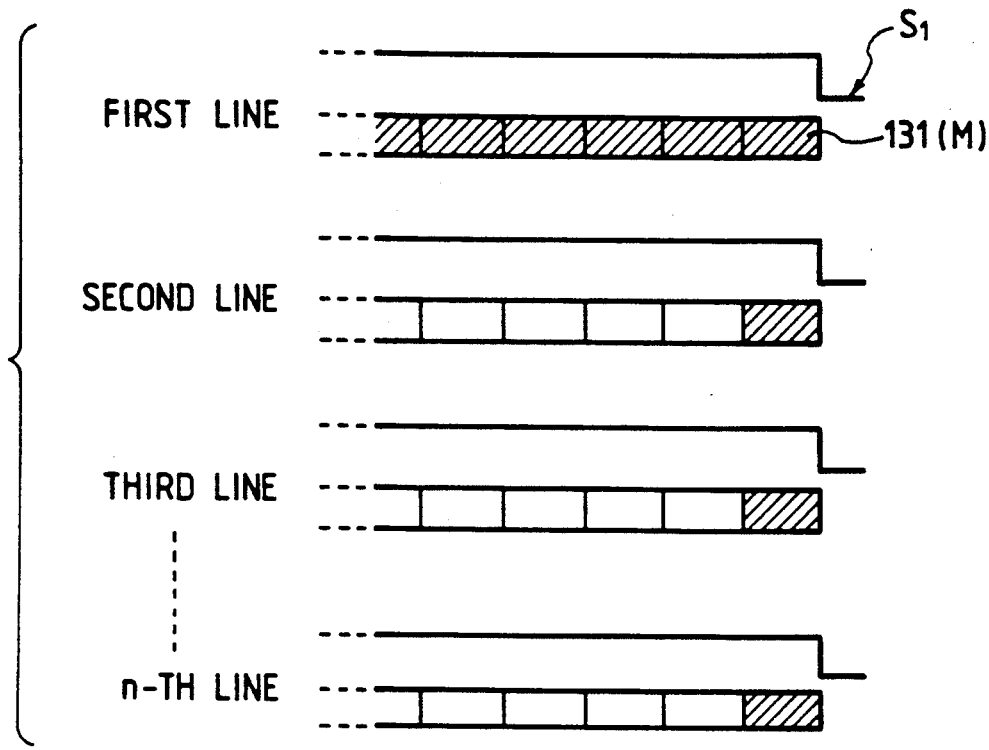
Figure 13D:
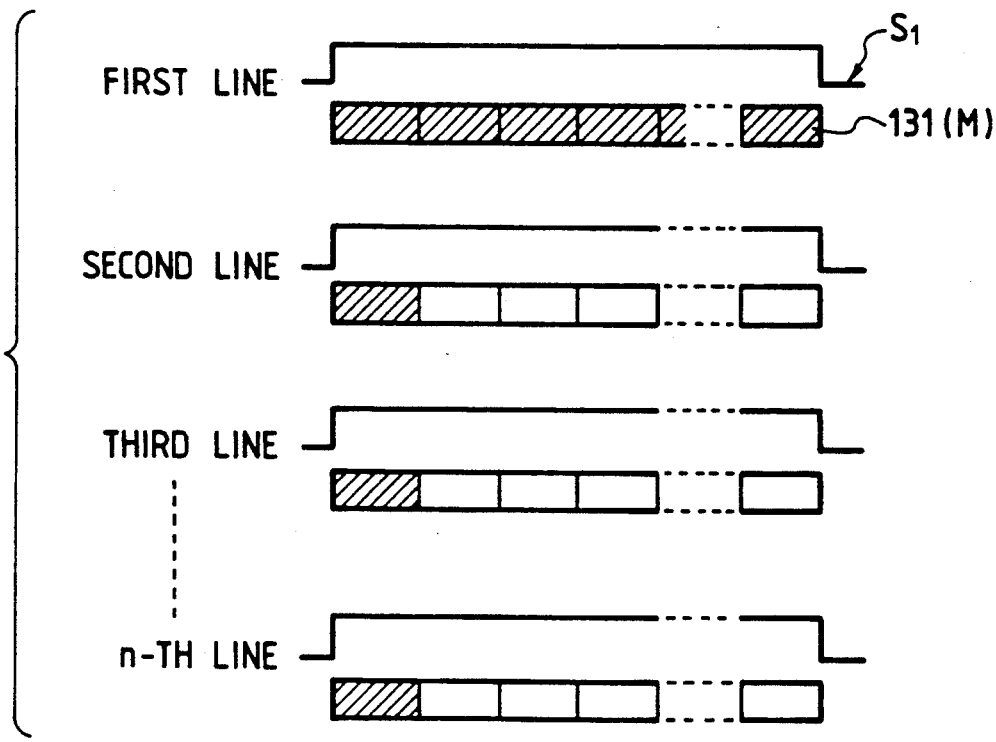

Then, when any EOL interrupt occurs, the CPU 103 finds the start address for the next line by arithmetic operations in the interrupt processing routine to be described later and sets the start address in the DMAC 109. These processing operations are set in such a manner as to be finished within the dead time for the main scan synchronizing signal $S_1$, as shown in FIG. 11 (b).

With this set-up of timing, the second line of the first page is written not in the area where the first line of the second page ought to be written, but unfailingly in the proper area where the second line of the first page ought to be written, as illustrated by the solid line in FIG. 10.

(4-a-2) Interrupt Processing Routine (1)

Black Data Boundary Region Forming Process

This interrupt processing routine (1) is performed by the EOL interrupt. Basically, this routine executes the process for the formation of a black data boundary region in addition to the preparatory process for performing the development of picture image data on the next scanning line, as mentioned above. The details of this interrupt processing routine are illustrated in FIG. 12 (a) through FIG. 12 (d).

In these FIG. 12 (a) through FIG. 12 (d), the CPU 103 checks whether or not the original document is the first sheet, the second sheet, the third sheet, or the fourth sheet (ST 1 to ST 4). If the original document is not one of these, the CPU 103 performs operations for processing an abnormal state, thereby putting a message such as, "The checked number of sheets of the original document is different from the set number of sheets of the original document" on the user interface (hereinafter abbreviated to "UI") (ST 5). However, if the checked number of the original document is one of the set number of sheets, the CPU 103 moves on to the next processing step.

Now, if the currently processed sheet of the original document is the first sheet, the CPU 103 checks whether or not the line being scanned is the final line (it is further assumed here that the number of lines on a single page is n-lines in this example of preferred embodiment) (ST 6), as shown in FIG. 12 (a). If the line being scanned is not the final line, the CPU 103 overwrites the last pixel on the particular line with black data 131 as boundary region data M (ST 7), but, if the line is the final line on the page, the CPU 103 overwrites the entire part of the particular line with black data 131 as the boundary region data M (ST 8), as shown in FIG. 13 (a).

If the currently processed sheet is the second sheet of the original document, the CPU 103 checks whether the line being scanned is the final line on the page (ST 9) as shown in FIG. 12 (a) and FIG. 12 (b). If the line is not the final line, the CPU 103 overwrites the pixel in the initial position on the line with the black data 131 as the boundary region data M (ST 10), if the line is the final line, the CPU 103 overwrites the entire part of the particular line with black data 131 as the boundary region data M (ST 8), as shown in FIG. 13 (b).

If the sheet currently processed is the third sheet of the original document, the CPU 103 checks whether or not the line being scanned is the initial line (ST 11), as shown in FIG. 12 (a) and FIG. 12 (c). If the line being scanned is not the initial line, the CPU 103 overwrites the last pixel on the particular line with black data 131 as the boundary region data M (ST 7), but, if the line is the initial line on the sheet, the CPU 103 overwrites the entire part of the particular line with black data 131 as the boundary region data M (ST 8), as shown in FIG. 13 (c).

Furthermore, if the currently processed sheet is the fourth sheet of the original document, the CPU 103 checks whether the line being scanned is the initial line on the page (ST 12) as shown in FIG. 12 (a), FIG. 12 (b), and FIG. 12 (d), and, if the line is not the initial line, the CPU 103 overwrites the pixel in the initial position on the line with the black data 131 as the boundary data M (ST 10), but, if the line is the initial line, the CPU 103 overwrites the entire part of the particular line with the black data 131 as the boundary region data M (ST 8), as shown in FIG. 13 (d).

In this interrupt processing routine, the CPU 103 finds the start address of the next scanning line by arithmetic operations (ST 13), as shown in FIG. 12 (a), after the black data boundary region forming process as described above has been performed, and sets the start address mentioned above in the input side DMA address generating circuit 121 (St 14). Thereafter the CPU 103 returns to the initial step.

Throughout the execution of this interrupt processing routine, the black data 131 (FIG. 19) as the boundary region data M are written together with the picture image data $G_1$ through $G_4$, in the belt-boundary regions where the individual picture image data $G_1$ through $G_4$ are placed in mutually adjacent positions.

(4-a-3) Example of Picture Image Output

Figure 14:
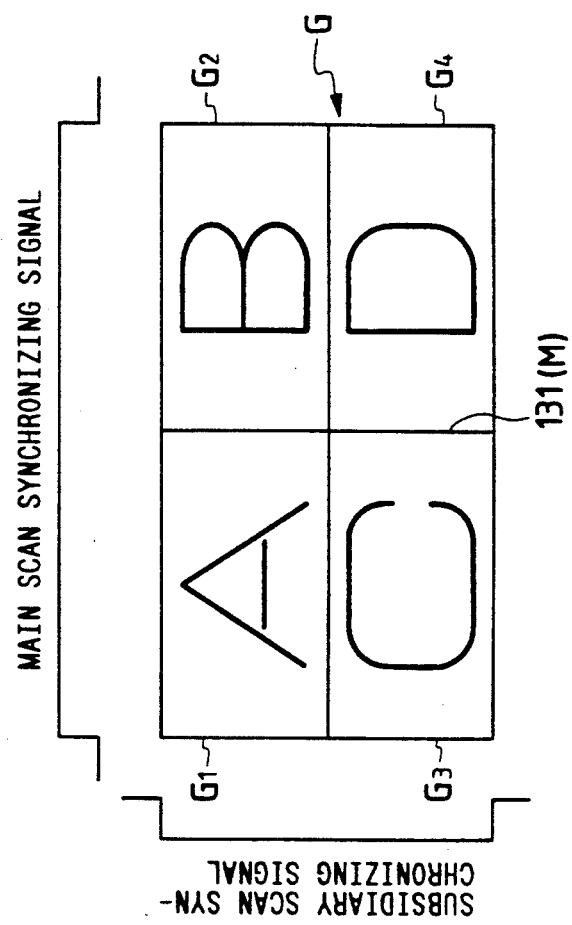
FIG. 14 illustrates the timing for the output of the picture images to the picture image output unit after their editing.
Figure 19:
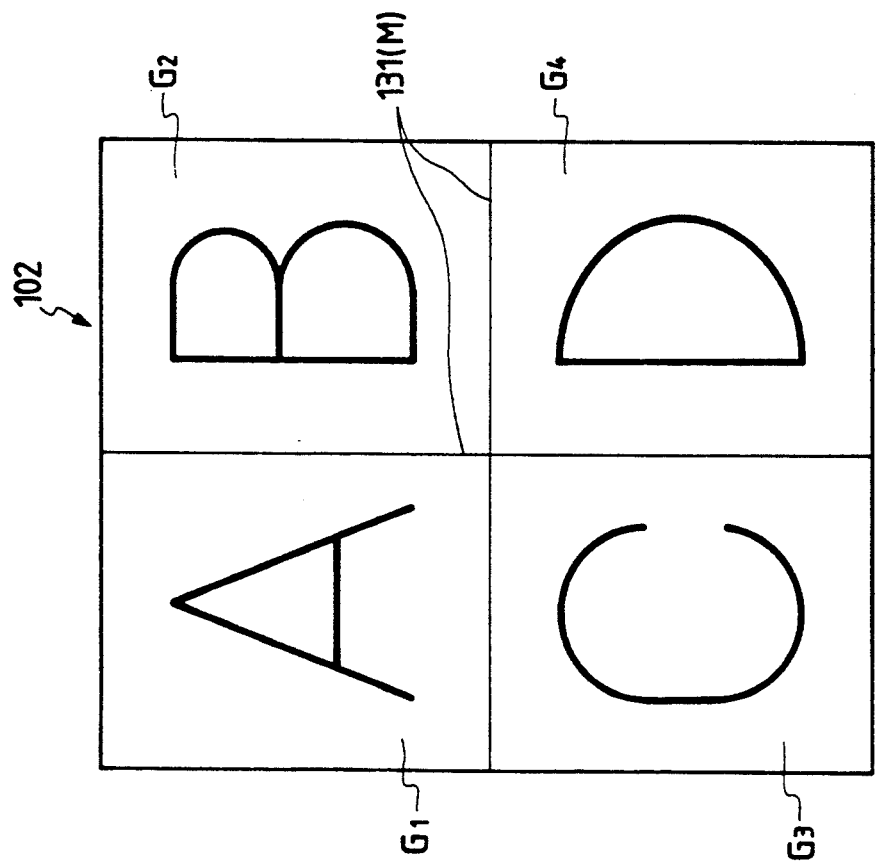

The picture image data G which have been processed by such picture image editing operations as those described above are edited into the state with the composite picture image data $G_1$ through $G_4$ of the four sheets of the original document as marked off by the boundary region data M, composed of the black data 131, in the page memory device 102, as shown in FIG. 19. The composite picture image data are subsequently transmitted, at the timing shown in FIG. 14, to the picture image output unit 50 and output therefrom as though the picture images were taken from one sheet.

Accordingly, the application of the black data boundary region forming process to the editing process of picture image data offers greater ease and simplicity in performing the subsequent processes, such as folding and cutting when the edited picture image data are output in the form of hard copies. Moreover, the picture image editing system according to the present invention produces higher perceptibility in the boundary regions of the individual picture image data, which offers greater facility in the reediting jobs and other processing jobs performed on the picture image data edited by this picture image editing system and then fed into a workstation or a personal computer system.

(4-a-4) Example of Modified Black Data Boundary Region Forming Process

Figure 20:
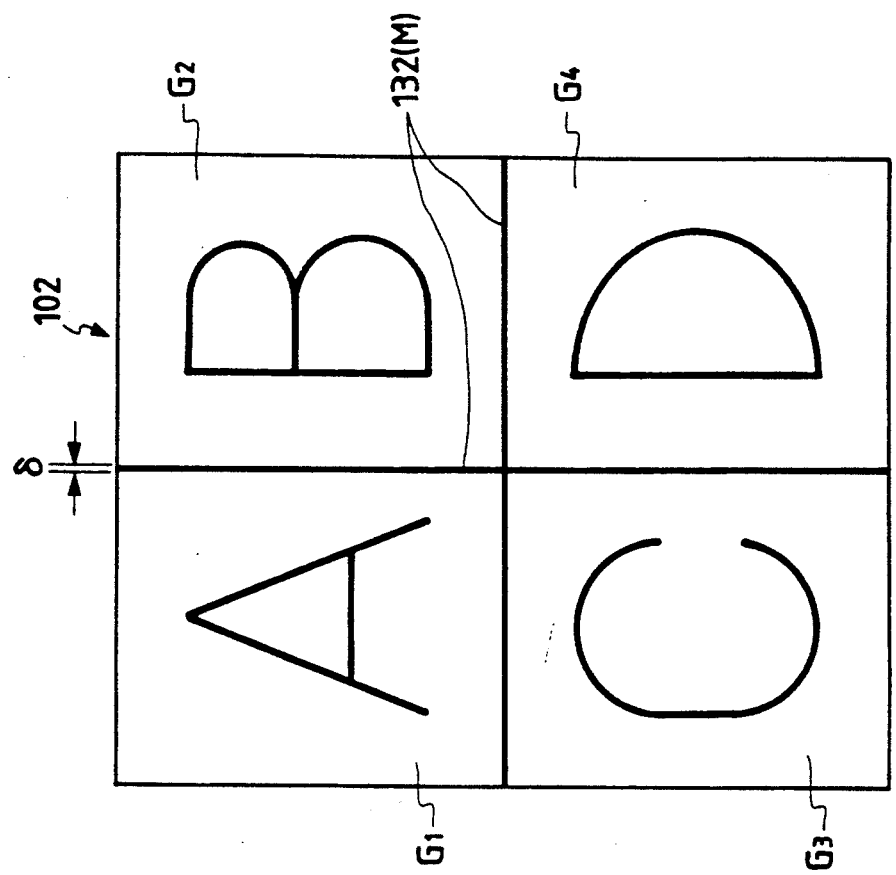

FIG. 20 presents an example of a modified black data boundary region forming process, in which black data 132 composed of a thick line are used for the boundary region data M.

This modified process can be executed by overwriting with the black data several pixels as counted from the final pixel on each line of the picture image data $G_1$ and $G_3$ and overwriting with the black data several lines as counted from the final line of picture image data $G_1$ and $G_3$ while overwriting with the black data several pixels as counted from the initial pixel on each line of the picture image data $G_2$ and $G_4$ and overwriting with the black data several lines as counted from the initial line of the picture image data $G_2$ and $G_4$.

Figure 21:
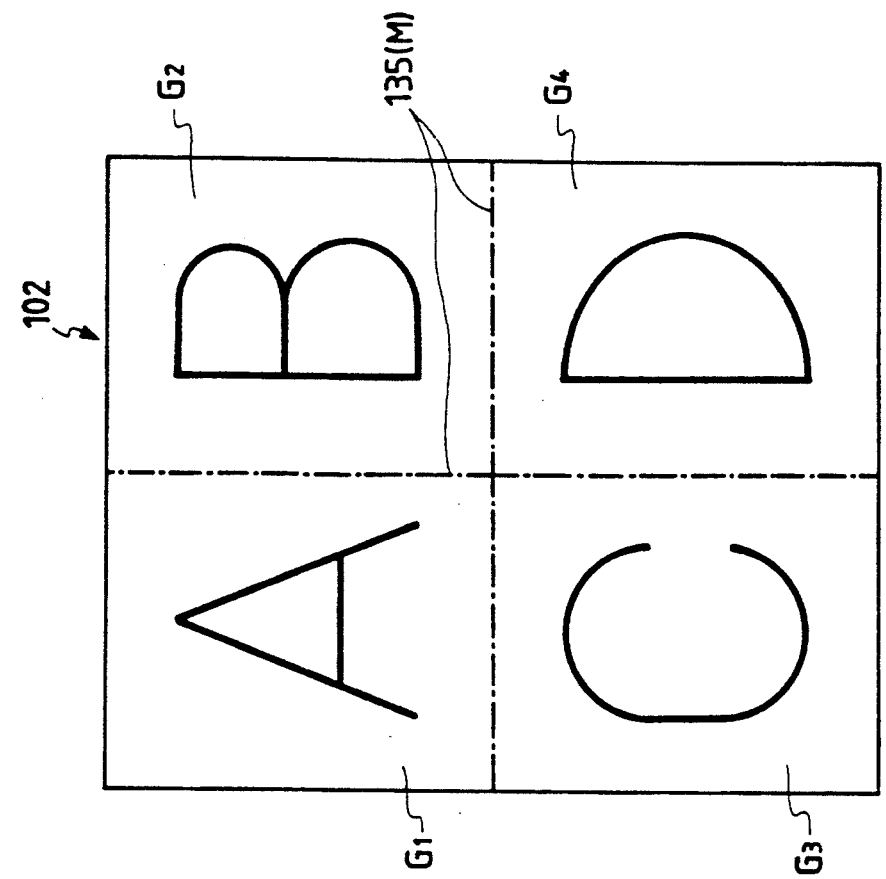

Then, FIG. 21 shows an example of another modified boundary region in which the black data 133 and the white data 134, each composed of a single dot chain line, are used as the boundary region data M.

This modified process can be executed by overwriting the final pixel of each line of the picture image data $G_1$ and $G_3$ with the black data or with the white data in the appropriate order, and also overwriting the final line of the picture image data $G_1$ and $G_3$ at appropriate intervals with the black data or the white data while overwriting the initial pixel on each line of the picture image data $G_2$ and $G_4$ with the black data or the white data in the appropriate order and overwriting the initial line of the picture image data $G_2$ and $G_4$ at appropriate intervals with the black data or the white data.

Figure 22:
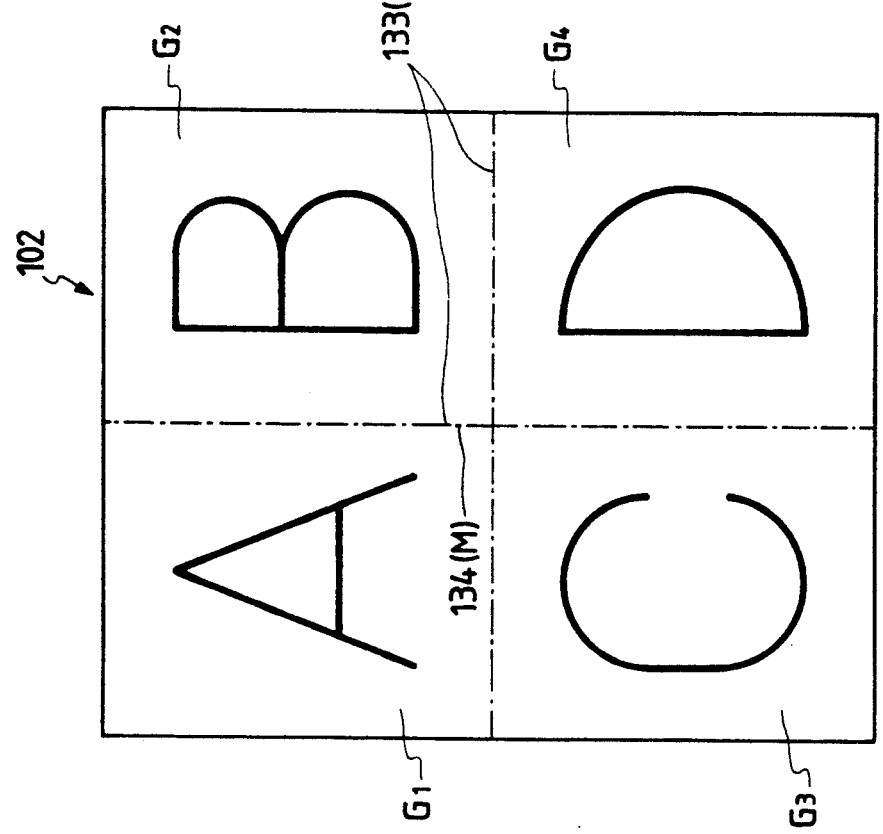

In this regard, FIG. 22 shows an example of still another modified process, which uses a thick single dot chain line 135 for the boundary region data M. Basically, this modified process can be executed by a performing a combination of the process shown in FIG. 21 and the process for changing the thickness of the line (the process shown in FIG. 20).

(4-b-1) Interrupt Processing Routine (2)

Inner Frame Setting Boundary Region Forming Process

This interrupt processing routine (2) is performed by the EOL interrupt. Basically this routine executes the process for the formation of an inner frame setting boundary region in addition to the preparatory process for performing the development of picture image data on the next scanning line, as mentioned above. The details of this interrupt processing routine are illustrated in FIG. 15 (a) through FIG. 15 (c). In this example, moreover, the individual picture image data G1 through G4 are processed for their reduction at a reduction ratio smaller than 50 per cent and are processed in such a way that a demarcating area in the shape of a cross forms a dividing boundary among the individual picture image data G1 through G4 in the page memory device 102.

In these FIG. 15 (a) through FIG. 15 (c), the CPU 103 checks whether or not the sheet being processed is the first sheet, the second sheet, the third sheet, or the fourth sheet in the original document (ST 1 to ST 4). If the particular sheet of the original document is not one of these, the CPU 103 performs operations for processing an abnormal state, thereby putting such a message as, "The checked number of sheets of the original document is different from the set number of sheets of the original document" on the user interface (UT) (ST 5). However, if the checked number of the original document is one of the set numbers, the CPU 103 moves on to the individual processing steps.

Figure 23:
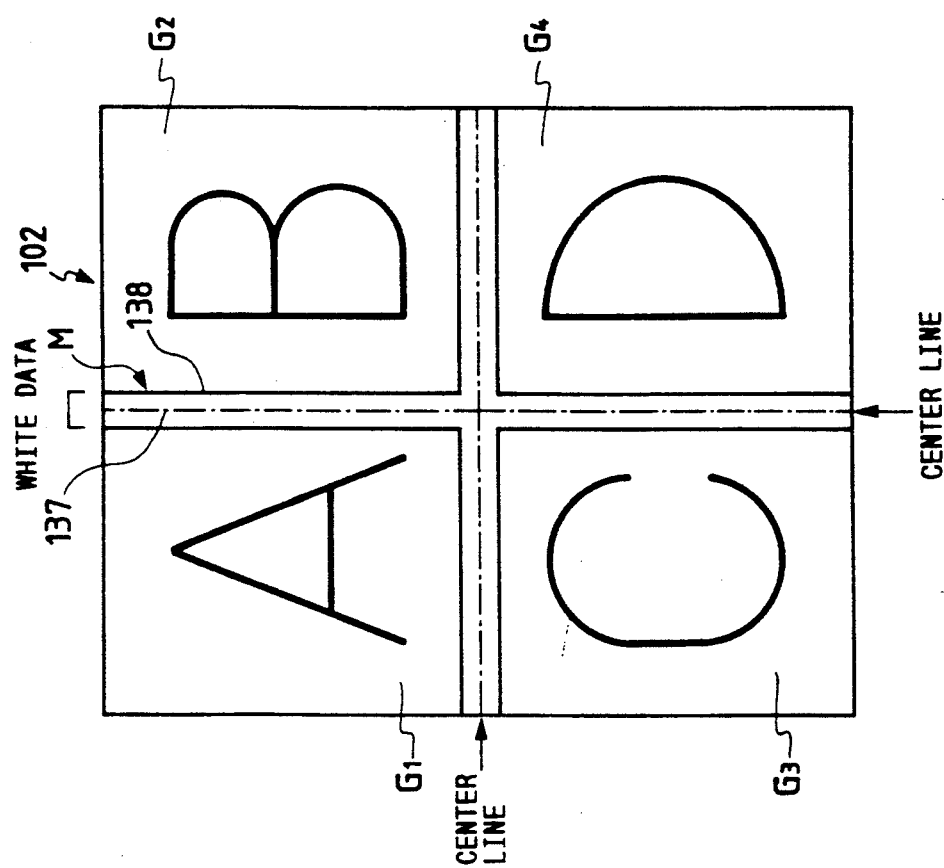

Now, if the currently processed sheet of the original document is the first sheet, the CPU 103 checks whether or not the line being scanned is the final line (it is assumed here that the number of lines on a single page is n-lines in this example of preferred embodiment) (ST 6), as shown in FIG. 15 (a). If the line being scanned is not the final line, the CPU 103 overwrites the last pixel on the particular line with the black data 136 as the boundary region data M (ST 7) and also writes the white data 137 as the boundary region data M to the area between the last part of the line to the center line (which is shown with the single dot chain line in this example) (ST 8). If the line is the final line on the page, then the CPU 103 overwrites the entire part of the particular line with the black data 136 as the boundary region data M (ST 9) and also writes the white data 137 as the boundary region data M to all the lines from the next line to the central line (ST 10), as shown in FIG. 23.

Also, if the currently processed sheet is the second sheet of the original document, the CPU 103 checks whether the line being scanned is the final line on the page (ST 11) as shown in FIG. 15 (a) and FIG. 15 (b). If the line is not the final line, the CPU 103 writes the pixel in the initial position on the line with the black data 136 as the boundary region data M (ST 12) and also writes the white data 137 as the boundary region data M to the section from the central line to the initial part of the line (ST 13), but, if the line is the final line, the CPU 103 overwrites the entire part of the particular line (ST 9) with the black data 136 as the boundary region data M and also writes the white data 137 as the boundary region data M to all the lines from the next line to the central line (ST 10), as shown in FIG. 23.

Figure 15A:
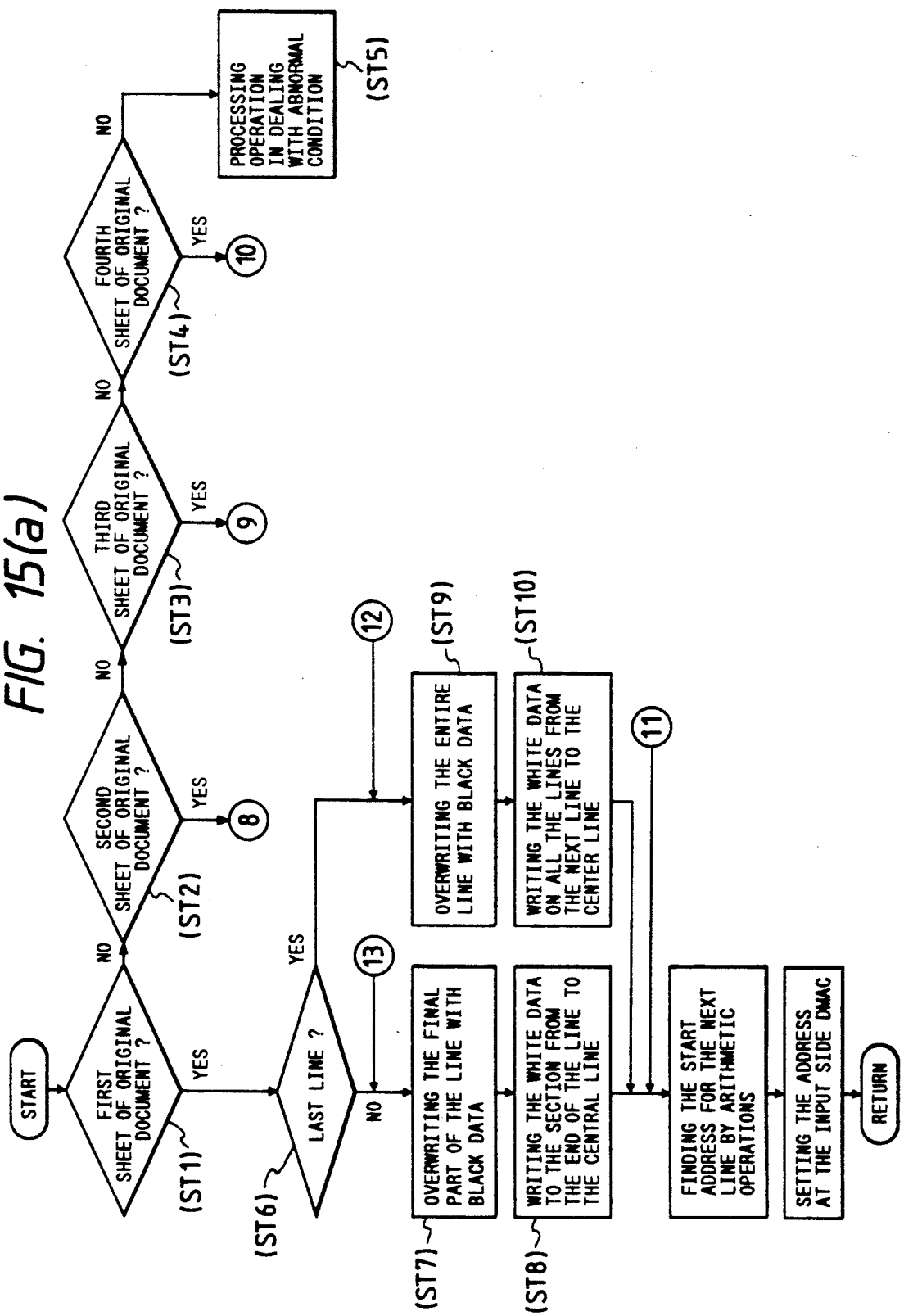

Moreover, if the sheet currently processed is the third sheet of the original document, the CPU 103 checks whether or not the line being scanned is the initial line (ST 14), as shown in FIG. 15(a) and FIG. 15(c). If the line being scanned is not the initial line, the CPU 103 overwrites the last pixel on the particular line the black data 136 as the boundary region data M (ST 7) and also writes the white data 137 as the boundary region data M in the area from the final part of the line to the central line (ST 8), but, if the line is the initial line on the page, then the CPU 103 overwrites the entire part of the particular line with the black data 136 as the boundary region data M (ST 15) and also writes the white data 137 as the boundary region data M on all the lines from the central line to the initial line (ST 16), as shown in FIG. 23.

Furthermore, if the currently processed sheet is the fourth sheet of the original document, the CPU 103 checks whether the line being scanned is the initial line on the page (ST 17) as shown in FIG. 15(a) through FIG. 15(c). If the line is not the initial line, the CPU 103 overwrites the pixel in the initial position on the line with the black data 136 as the boundary region data M (ST 12) and also writes the white data 137 as the boundary region data M to the section of the line between the central line to the initial part of the line (ST 13), but, if the line is the initial line, the CPU 103 overwrites the entire part of the particular line with the black data 136 as the boundary region data M (ST 15) and also writes the white data 137 as the boundary data M to all the lines between the central line to the initial line (ST 16), as shown in FIG. 23.

In this interrupt processing routine, the CPU 103 finds the start address of the next scanning line by arithmetic operations (ST 18), as shown in FIG. 15(a), after the inner frame setting boundary region forming process as described above has been performed (namely, the process performed for setting a frame in the boundary region at the inner side of the individual picture image data $G_1$ through $G_4$), and sets the start address mentioned above in the input side DMA address generating circuit 121 (ST 19). Thereafter, the CPU 103 returns to the initial step.

Through the execution of this interrupt processing routine, the white data 137 in a cross shape with the black data 136 forming the contour are written as the boundary region data M, together with the picture image data $G_1$ through $G_4$, as shown in FIG. 23, where the individual picture image data $G_1$ through $G_4$ are placed in mutually adjacent positions.

Accordingly, the application of the inner frame setting boundary region forming process as described above to the editing process of picture image data offers greater ease in performing the subsequent processes, because the process furnishes folding margins, cutting margins, pasting margins or the like in such cases as the output of the edited picture image data in the form of hard copies and the binding of such hard copies into a book form. Moreover, the picture image editing system according to the present invention produces the edited picture image data in a demarcating boundary region where the boundaries of the individual groups of the picture images are in mutual contact. This feature offers greater facility in the course of reediting jobs and other processing jobs performed on the picture image data edited by this picture image editing system and then fed into a workstation or a personal computer system.

(4-b-2) Example of Modified Inner Frame Setting Boundary Region Forming Process

Figure 24:
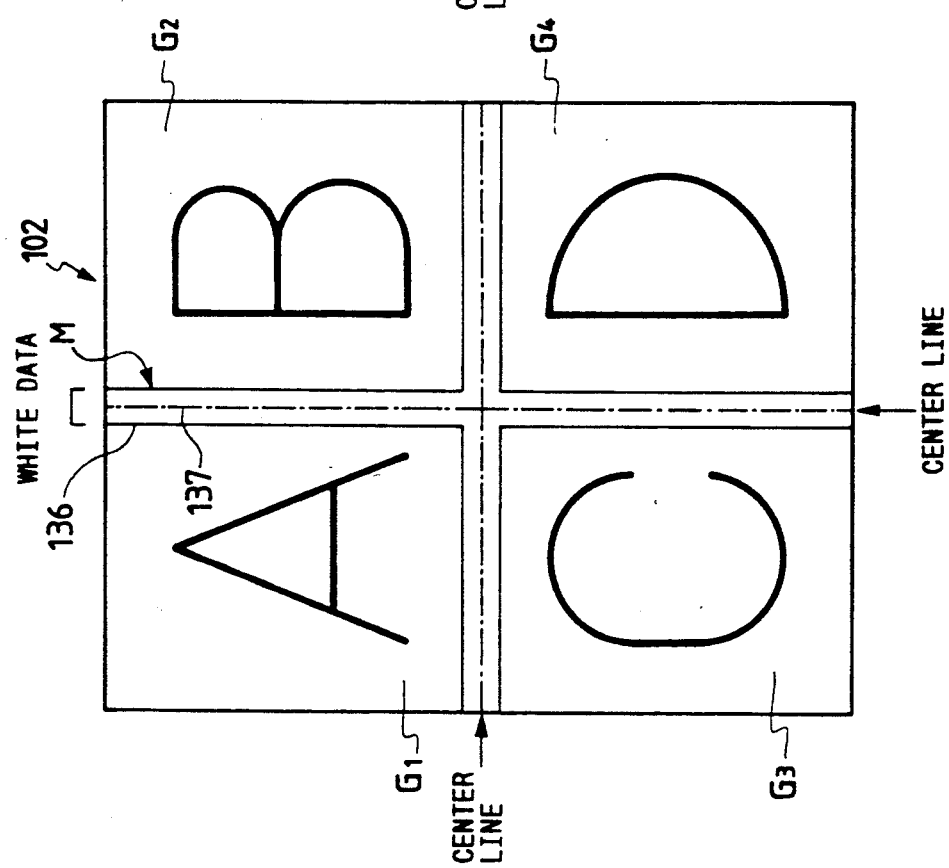

FIG. 24 presents an example of a modified inner frame setting boundary region forming process, in which the black data 132 composed of a thick line is used as the boundary region data M in the contour area of the white data 137 in a belt shape.

This modified process can be executed by overwriting with the black data of several pixels as counted from the final pixel on each line of the picture image data $G_1$ and $G_3$ and also overwriting with the black data several lines as counted from the final line of the picture image data $G_1$ and $G_3$ while overwriting with the black data several pixels as counted from the initial pixel on each line of the picture image data $G_2$ and $G_4$ and also overwriting with the black data several lines as counted from the initial line of the picture image data $G_2$ and $G_4$.

Then, FIG. 25 shows an example of another modified example in which the black data 139 and the white data 140 each composed of a dotted line are used as the boundary region data M in the contour area for the white data 137 in a belt shape.

This modified process can be executed by overwriting the final pixel of each line of the picture image data $G_1$ through $G_3$ with the black data or the white data, finding the order of the particular line and overwriting the final line of the picture image data $G_1$ and $G_3$ at appropriate intervals with the black data or the white data while overwriting the initial pixel on each line of the picture image data $G_2$ through $G_4$ with the black data or the white data, finding the order of the particular line, and also overwriting the initial line of the picture image data G$_2$ and G$_4$ at appropriate intervals with the black data or the white data.

In this regard, FIG. 26 shows an example of still another modified process, which uses a thick dotted line 141 as the boundary region data M in the contour area of the white data 137 in a belt shape. Basically, this modified process can be executed by a performing a combination of the process shown in FIG. 25 and the process for changing the thickness of the line (namely, the process shown in FIG. 24).

Figure 27:
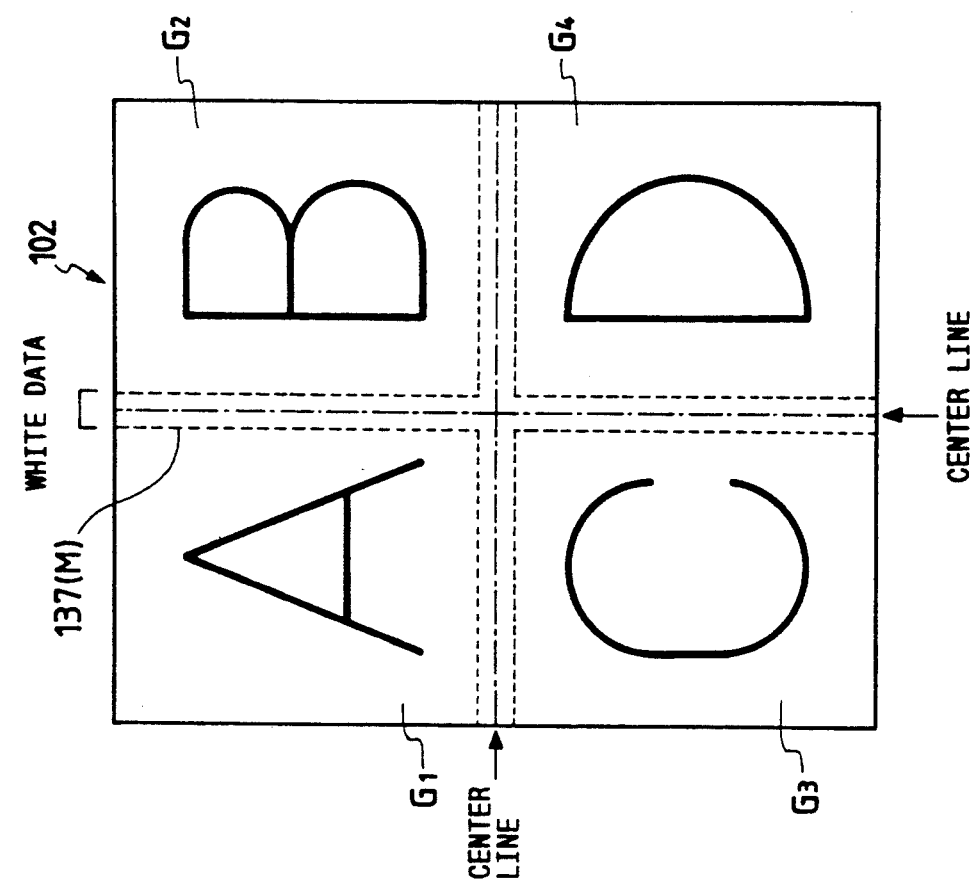

Furthermore, FIG. 27 shows an example of still another modified process, which uses only the white data 137 as the boundary region data M.

(4-c-1) Interrupt Processing Routine (3)

Outer Frame Setting Boundary Region Forming Process

This interrupt processing routine (3) is performed by the EOL interrupt. Basically this routine executes the process for the formation of a boundary region with an outer frame set therein (including the process for the formation of a black data boundary region in the case of this example of preferred embodiment) in addition to the preparatory process for performing the development of picture image data on the next scanning line, as mentioned above. The details of this interrupt processing routine are shown in FIG. 16(a) through FIG. 16(d). In this example, moreover, the individual picture image data G1 through G4 are processed for their reduction at a reduction ratio smaller than 50 per cent, and are processed in such a way that the individual picture image data G1 through G4 are arranged in mutually adjacent positions in the page memory device 102 with a blank demarcating area formed on the outer areas of the individual picture image data G1 through G4 in the page memory device 102.

In FIG. 16(a) through FIG. 16(d), the CPU 103 checks whether or not the currently processed sheet in the original document is the first sheet, the second sheet, the third sheet, or the fourth sheet (ST 1 to ST 4). If the original document is none of these, the CPU 103 performs operations for processing an abnormal state, thereby putting a message such as, "The checked number of sheets of the original document is different from the set number of sheets of the original document" on the UI (abbreviation of the term, "user interface") (ST 5). However, if the checked number of the original document is one of the set numbers, the CPU 103 moves on to the next processing step.

Figure 16A:
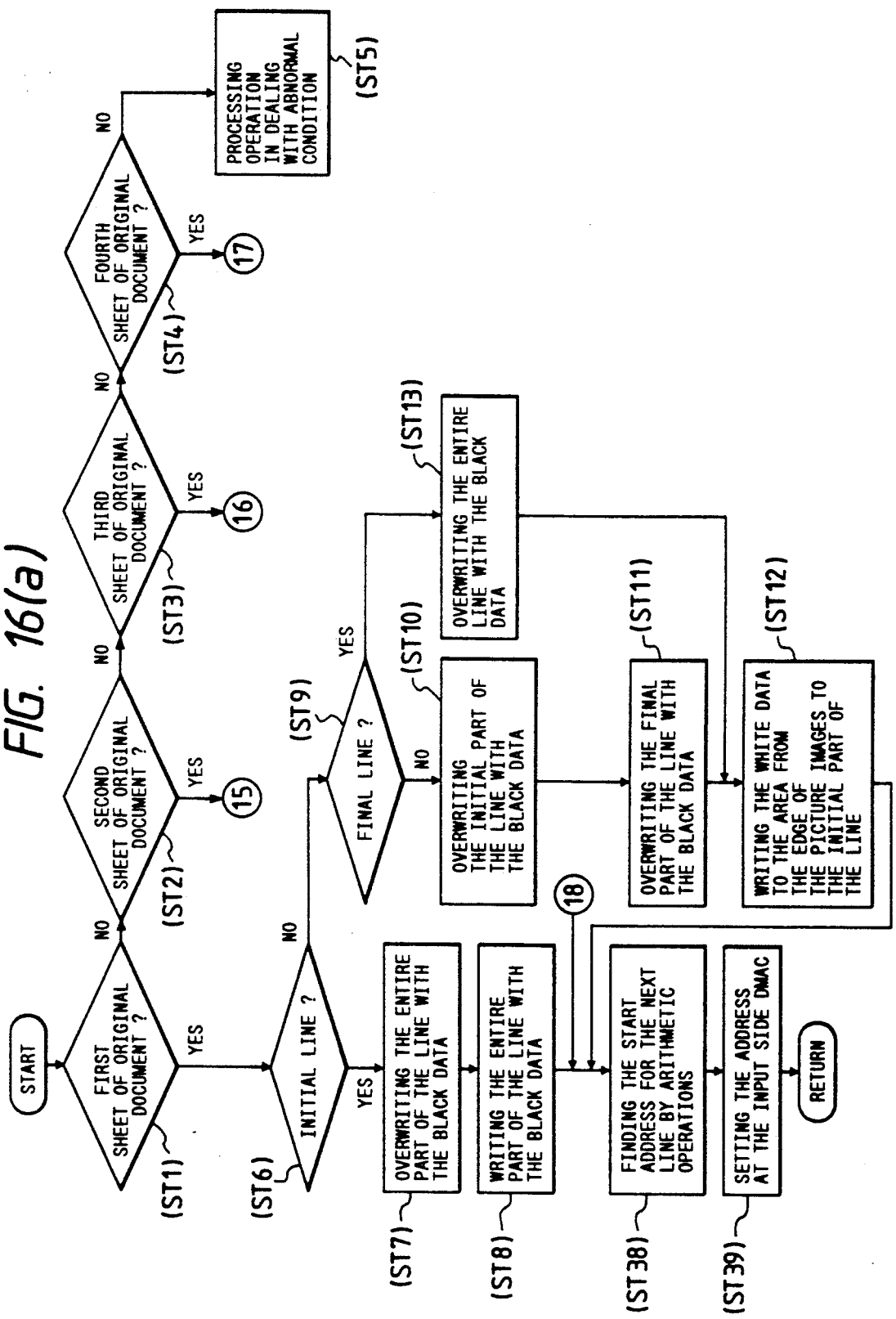
FIG. 16 (a) through (d) are flow charts respectively illustrating the interrupt processing routine (3) by the EOL (end-of-line) interrupt.
Figure 28:
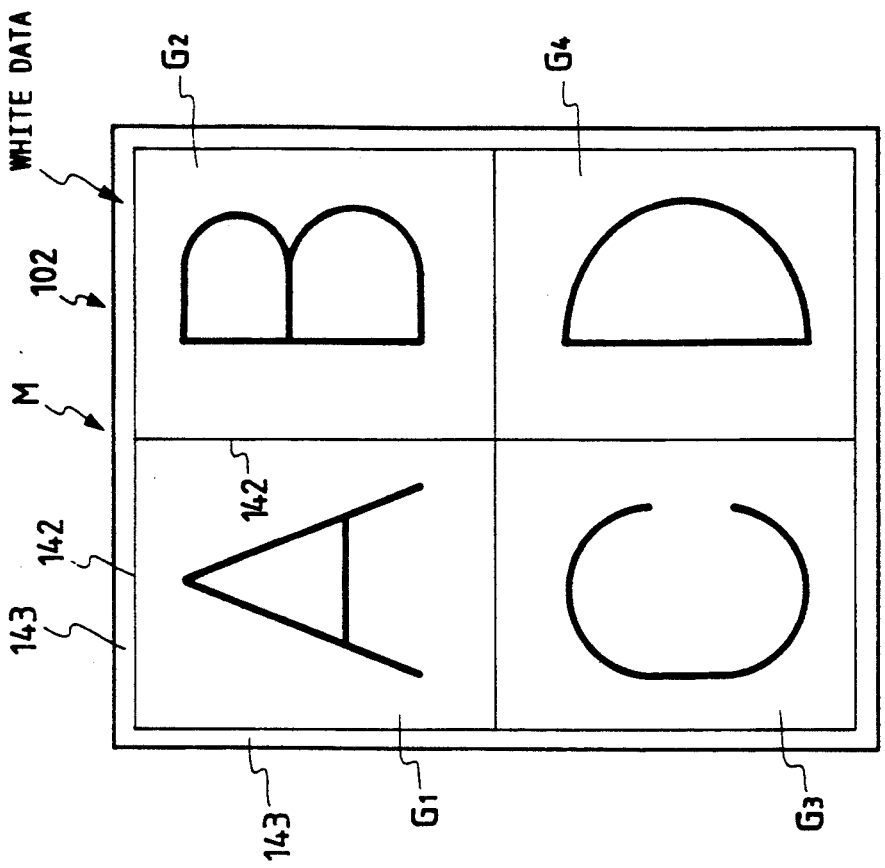

Now, if the currently processed sheet of the original document is the first sheet, the CPU 103 checks whether or not the line being scanned is the initial line (it is assumed here that the number of lines on a single page is n-lines in this example of preferred embodiment) (ST 6), as shown in FIG. 16(a). If the line being scanned is the initial line, the CPU 103 overwritos the last pixel on the particular line with the black data 142 as the boundary region data M (ST 7) and also writes the white data 143 as the boundary region data M to all the lines from the edge of the picture image to the initial line (ST 8). If the line is the not the initial line on the page, the CPU 103 checks whether or not the particular line is the final line (ST 9). If the particular line is not the final line, the CPU 103 overwrites the initial part and final part of the line with the black data 142 as the boundary region data M (ST 10 and ST 11) and also writes the white data 143 as the boundary region data M in the area from the edge of the picture image to the initial part of the line (ST 12). If the particular line is the final line, the CPU 103 overwrites the entire part of the particular line with the black data 142 (ST 13) and also writes the white data 143 as the boundary region data M in the area between the edge of the picture images to the initial part of the line (ST 12), as shown in FIG. 28.

Figure 16B:
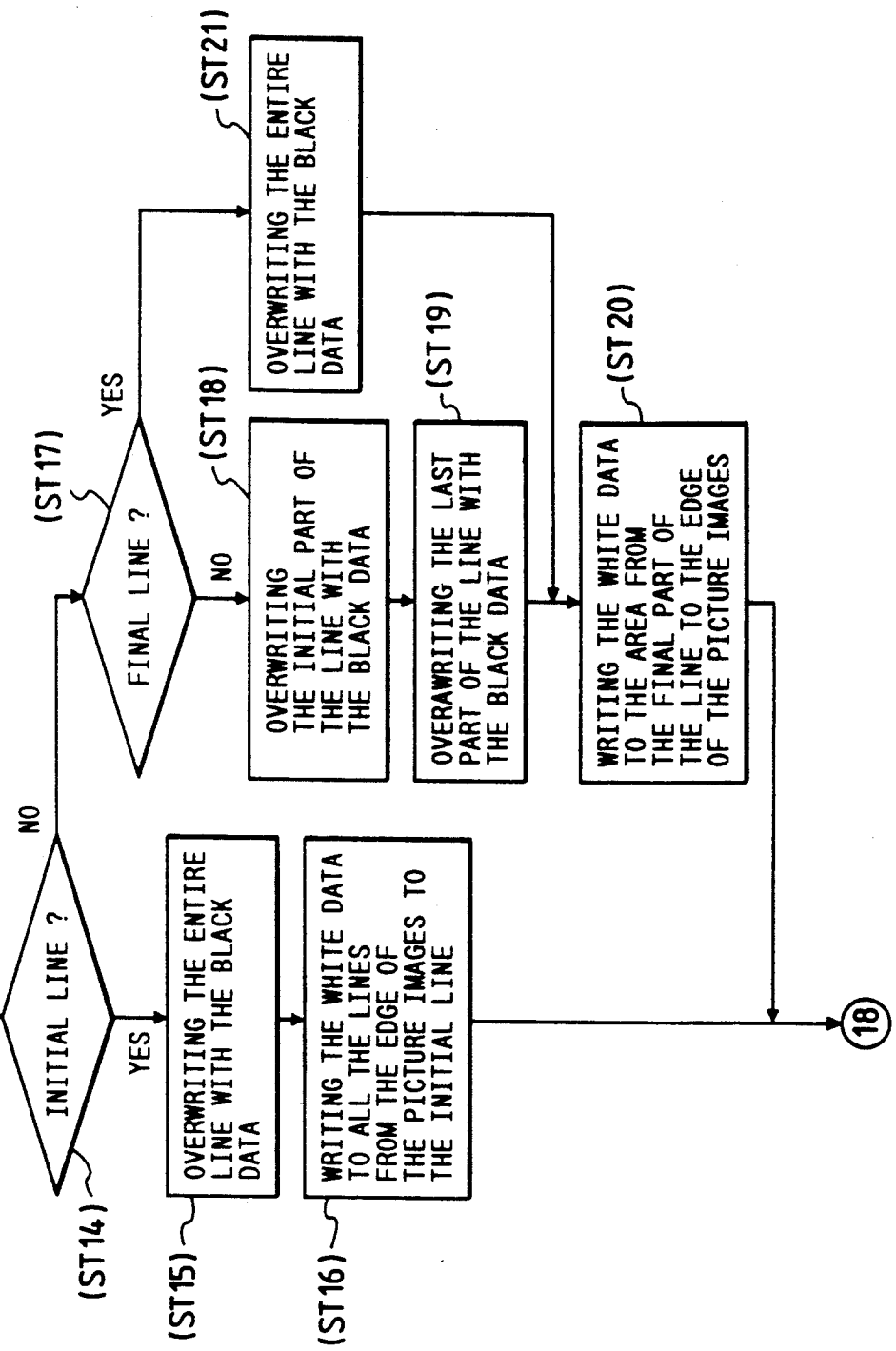

Also, if the currently processed sheet is the second sheet of the original document, the CPU 103 checks whether the line being scanned is the final line on the page (ST 14) as shown in FIG. 16(b). If the line is the initial line, the CPU 103 overwrites the entire part of the line with the black data 142 as the boundary region data M (ST 15) and also writes the white data 143 as the boundary region data M on all the lines from the edge of the picture images to the initial line (ST 16), as shown in FIG. 28. If the line is not the initial line, the CPU 103 checks whether or not the particular line is the final line (ST 17). If the particular line is not the final line, the CPU 103 overwrites the initial part and final part of the line with the black data 142 as the boundary region data M (ST 18 and ST 19) and also writes the white data 143 as the boundary region data M in the area between the final part of the line to the edge of the picture images (ST 20). If the particular line is the final line, then the CPU 103 overwrites the entire part of the particular line with the black data 142 as the boundary region data M (ST 21) and also writes the white data 143 as the boundary region data M in the area between the final part of the line to the edge of the picture images (ST 20), as shown in FIG. 28.

Moreover, if the sheet currently processed is the third sheet of the original document, the CPU 103 checks whether or not the line being scanned is the initial line (ST 22), as shown in FIG. 16 (c). If the line being scanned is the initial line, the CPU 103 overwrites the entire part of the line with the black data 142 as the boundary region data M (ST 23) and also writes the white data 143 as the boundary region data M in the area between the edge of the picture images to the initial part of the line (ST 24). If the line is not the initial line, the CPU 103 checks whether or not the particular line is the final line (ST 25). If the line is not the final line, the CPU 103 overwrites the initial part and last part of the line with the black data 142 as the boundary region data M (ST 26 and ST 27) and also writes the white data 143 as the boundary data M in the area between the edge of the picture images to the initial part of the line (ST 24). However, if the line is the final line, the CPU 103 overwrites the entire part of the line with the black data 142 as the boundary region data M (ST 28) and also writes the white data 143 as the boundary region data M to all the lines from the final line to the edge of the picture images (ST 29), as shown in FIG. 28.

Furthermore, if the currently processed sheet is the fourth sheet of the original document, the CPU 103 checks whether the line being scanned is the initial line on the page (ST 32) as shown in FIG. 16(d). If the line is not the initial line, the CPU 103 overwrites the entire line with the black data 142 as the boundary region data M (ST 31) and also writes the white data 143 as the boundary data M in the area between the final part of the line and the edge of the picture images (ST 32). If the particular line is not the initial line, the CPU 103 checks whether or not the line is the final line (ST 33). If the line is not the final line, the CPU 103 overwrites the initial part and final part of the line with the black data 142 as the boundary region data M (ST 34 and ST 35) and also writes the white data 143 as the boundary region data M in the area between the final part of the line to the edge of the picture elements (ST 32). If the line is the final line, the CPU 103 overwrites the entire part of the line with the black data 142 as the boundary region data M (ST 36) and also writes the white data 143 as the boundary region data M on all the lines in the area from the final line to the edge of the picture images (ST 37), as illustrated in FIG. 28.

In this interrupt processing routine, the CPU 103 finds the start address of the next scanning line by arithmetic operations (ST 38), as shown in FIG. 16(a), after the outer frame setting boundary region forming process (namely, the processing operations for setting up a frame at the outer side of the individual sets of picture image data $G_1$ through $G_4$) as described above, and the black data boundary region forming process has been performed, and then the CPU 103 sets the start address mentioned above in the input side DMA address generating circuit 121 (ST 39). Thereafter, the CPU 103 returns to the initial step.

Through the execution of this interrupt processing routine, the belt-shaped white data 143 having the black data 142 forming the inner contour thereof are written as the boundary region data M in the outer region of the individual picture image data $G_1$ through $G_4$, as illustrated in FIG. 28, and the black data 142 as the boundary region data M are written, together with the picture image data $G_1$ through $G_4$, respectively, in the cross-shaped boundary regions where the individual picture image data $G_1$ through $G_4$ are placed in mutually adjacent positions.

Accordingly, the application of the outer frame setting boundary region forming process to the editing process of picture image data as described above will prevent damages to the effective picture image region, even if any frame deleting process is performed at the side of the picture image output unit 50, when the picture images thus edited are output in the form of hard copies. In addition, since the black data boundary region forming process is performed in combination with the frame setting process on the picture images, this picture image editing system offers greater ease in performing various kinds of subsequent processes, owing to the accurate perceptibility of the boundaries among the individual picture images when the edited picture images are output in the form of hard copies or when reediting jobs and other processing jobs are performed on the picture image data edited by this picture image editing system and then fed into a workstation or a personal computer system.

Figure 29:
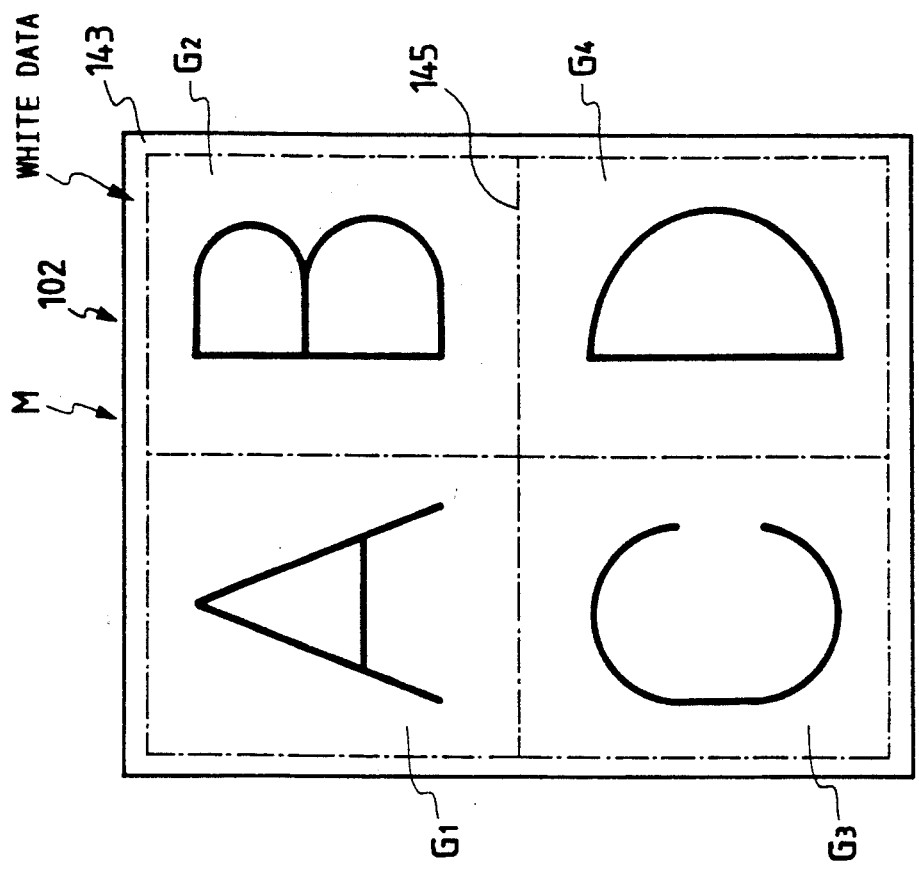
Figure 30:
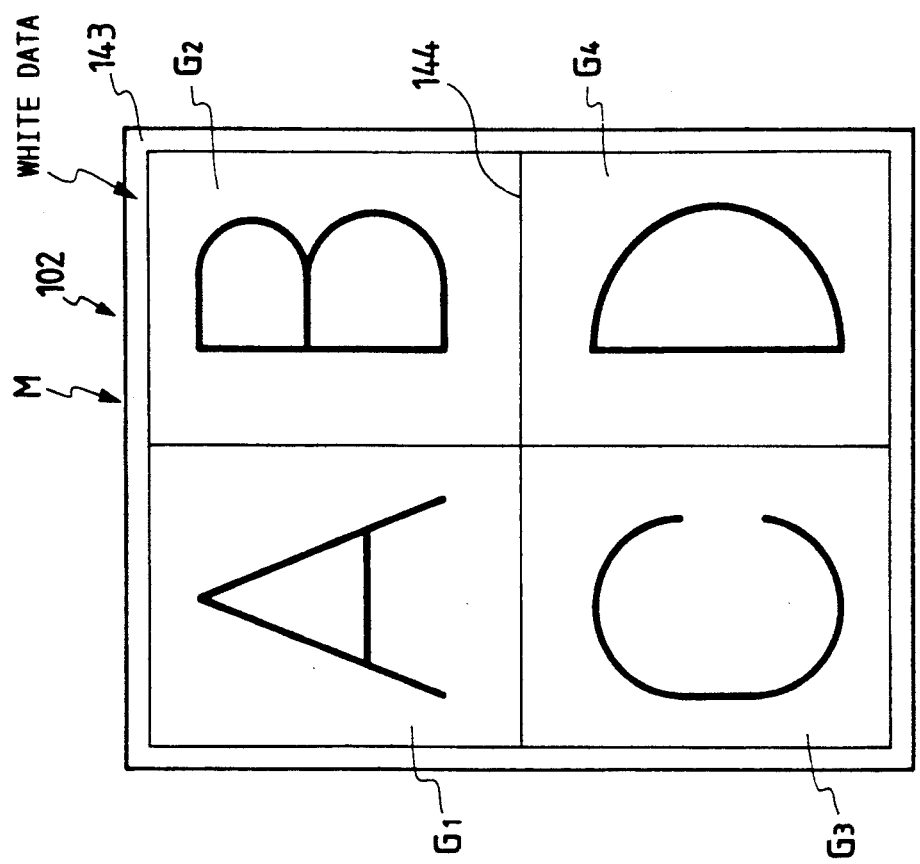

(4-c-2) Example of Modified Outer Frame Setting Boundary Region Forming Process FIG. 29 presents an example of a modified outer frame boundary region forming process, in which the black data 144 composed of a thick line are used for the boundary region data M, and FIG. 30 presents an example of another modified outer frame boundary region forming process, in which the black data 145 composed of a single dot chain line are used for the boundary data M. Furthermore, FIG. 31 presents still another modified outer frame boundary region forming process, in which only the white data 143 in the shape of a belt are used as the boundary data M in the demarcating area at the outer sides of the individual sets of picture image data $G_1$ through $G_4$.

(5) Cut and Paste Process

This cut and paste process is designed to process the picture image data for producing composite picture images in a single sheet format, working with variable reduction ratios as set appropriately at the reduction processing section 46 in the picture image input unit 20, for example, as shown in FIG. 32. Specifically, the first picture image data $G_1$ input from the picture image input unit 20 is formed into composite picture Image data rendered on a single sheet by synthesis with the second picture image data $G_2$ and the third picture image data $G_3$ input from the picture image input unit 20 and set in regular sequence into the first picture image data $G_1$ through their adequate size adjustment in the variable reduction ratios described above.

In the course of the processing operations as described above, there are troublesome circumstances in which it is difficult to perform subsequent processes on the picture images because the demarcating areas among the individual sets of picture image data are not distinct, particularly when the first set of picture image data $G_1$ and the subsequent sets of picture image data $G_2$ and $G_3$ are similar picture images, such as photographs.

Figure 34:
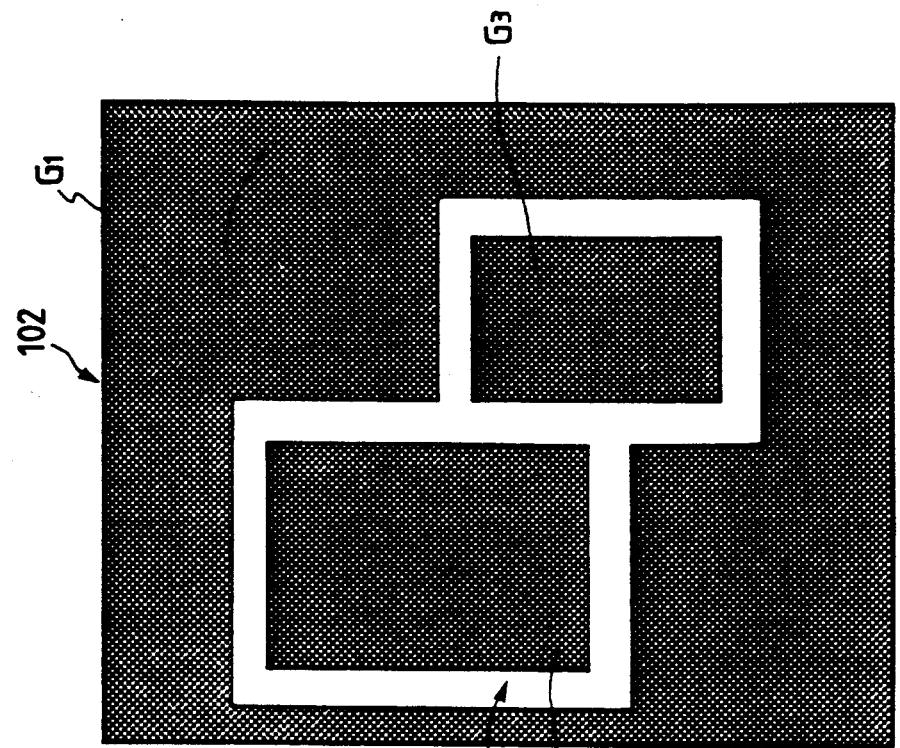
Figure 33:
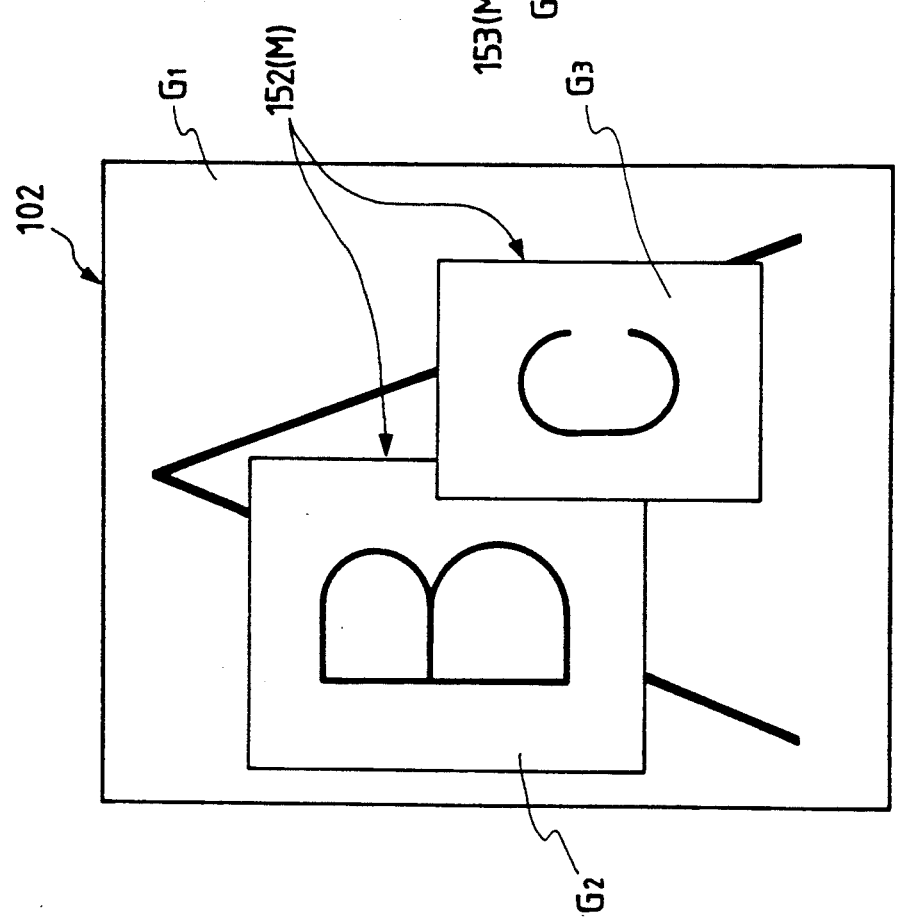
Figure 35:
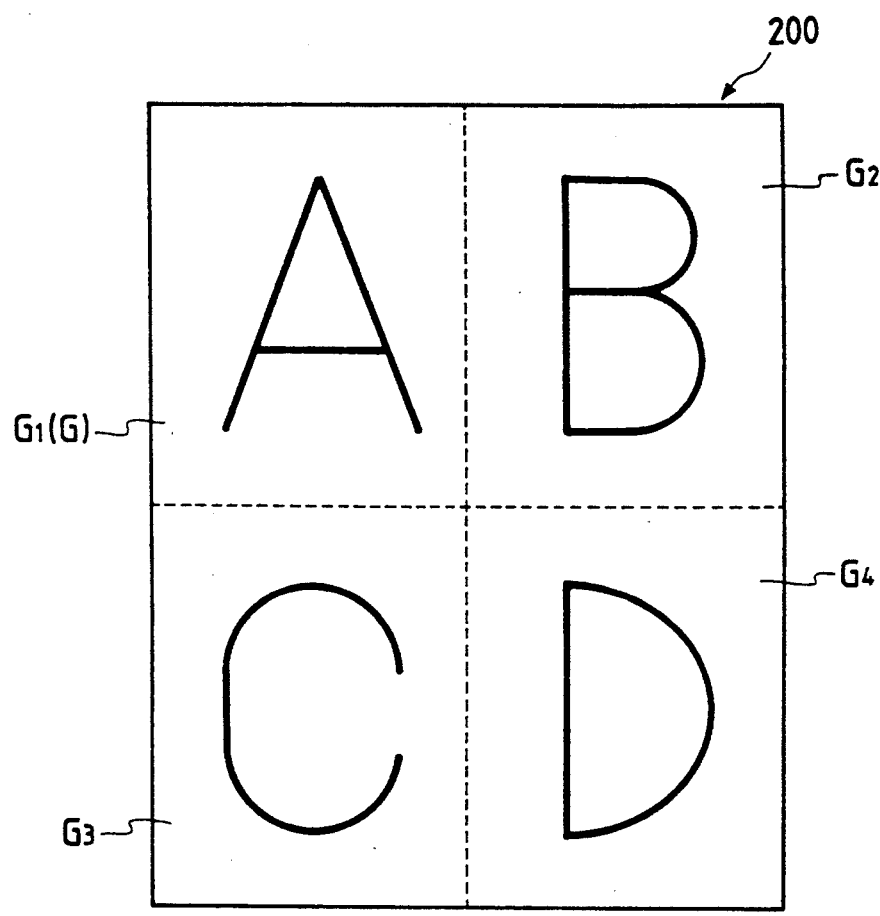
FIG. 35 illustrates an example of the conventional reverse posterization process.

In dealing with such a situation, the demarcating areas among the individual sets or groups of picture image data $G_1$, $G_2$, and $G_3$ will be made clearly perceptible by the execution of a prescribed boundary region forming process, as in the case of the process of reverse posterization described above in V-(4). It will be much easier to execute the subsequent processes if the black data 151 are applied as the boundary region data M to demarcating areas of the second picture image data $G_2$ and the third picture image data $G_3$, as shown in FIG. 32, or if the black data 152 composed of a thick line are applied as the boundary region data M, as shown in FIG. 33, or if the belt-shaped white data 153 are applied as the boundary region data M, as shown in FIG. 34.

(5) Example of Modified Picture Image Editing Process

This example of preferred embodiment performs the boundary region forming process at the time when the EOL interrupt is processed, but the present invention is not limited to this. For example, the picture image editing system according to the present invention may also be designed to operate with the flow of picture image editing operations as illustrated in FIG. 17.

In FIG. 17 just mentioned, the CPU 103 first performs the initialization of the system (ST 1) and then checks whether or not there is any input from the user interface (ST 2). If there is any input from the user interface, the CPU 103 executes the set-up of the system (ST 3).

After this, the CPU 103 checks whether or not the start button has been pushed (ST 4) and starts the picture image input unit (Image Input Terminal: IIT) at the time when the start button has been pushed (ST 5). The CPU 103 checks whether or not the picture image editing process (which includes such basic editing processes as the reverse posterization process and the cut and paste process) incidental to the input of an original document is finished (ST 6). When the picture image editing process has been completed, the CPU 103 executes the boundary region forming process (ST 7).

Then, at the stage where CPU 103 has completed the boundary region forming process, the CPU 103 starts the picture image output unit (the Image Output Terminal: IOT) (ST 8), checks whether or not the picture images have been output in the set number of sheets (ST 9), and, when the picture images have been output in the set number of sheets, the CPU 103 goes into a standby state ready for the next picture image processing job.

Figure 18:
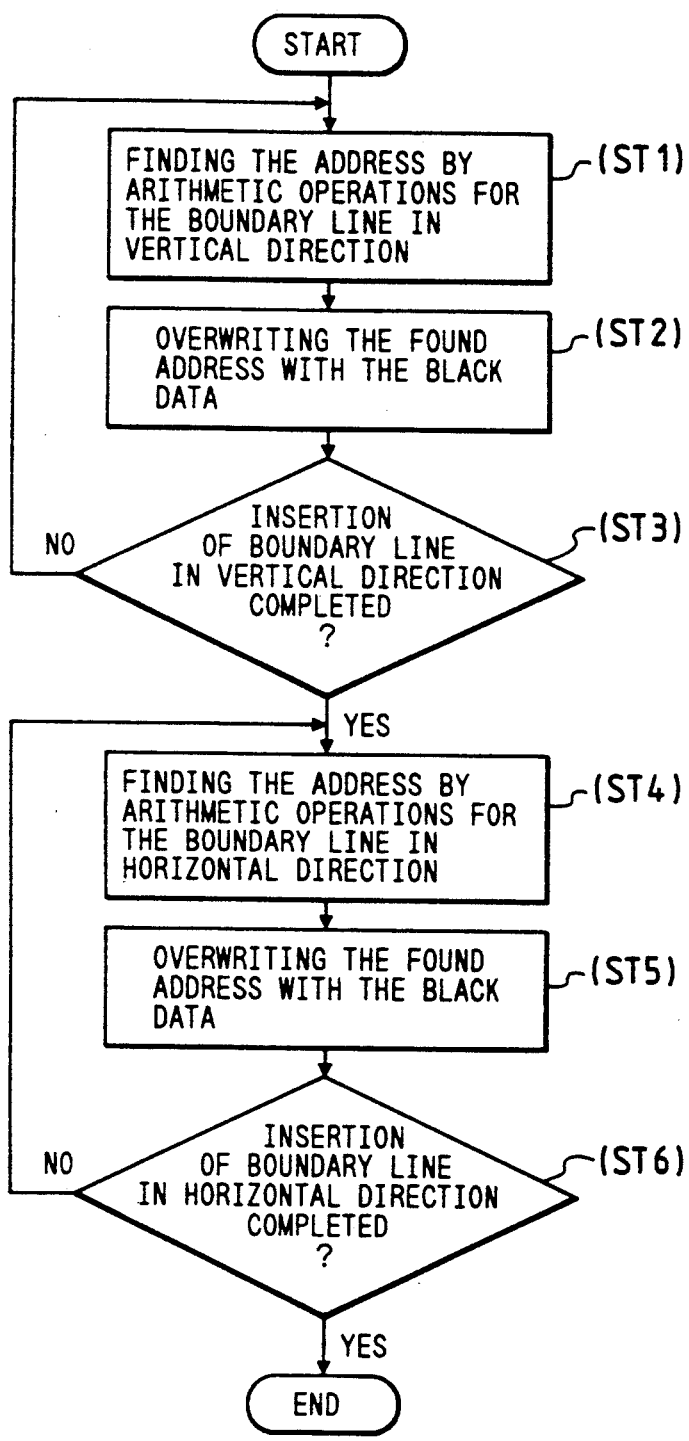
FIG. 18 is a flow chart illustrating the processing sequence for the formation of a boundary region in the picture image editing process.

In this modified example, the boundary region forming process to be employed is a process which overwrites the demarcating areas for the individual sets of picture image data with the black data used as the boundary region data M, and the flow of the processing operations in the boundary region forming process in this example is shown in FIG. 18.

In FIG. 18, the CPU 103 first finds the addresses of the boundary line area in the vertical direction by arithmetic operations performed in regular sequence (ST 1) and also overwrites the addresses thus obtained with the black data (ST 2), repeating the processes at the ST 1 and the ST 2 until the insertion of the boundary lines in the vertical direction is brought to an end (ST 3).

Thereafter, the CPU 103 finds the addresses for the boundary lines in the horizontal direction in regular sequence by arithmetic operations (ST 4) and also overwrites the addresses thus found with the black data (ST 5), thereafter repeating the processing operations at the ST 4 and the ST 5 until the insertion of the boundary lines in the horizontal direction is brought to an end (ST 6), and, at the stage where the insertion of the boundary lines in the horizontal direction is finished, the CPU 103 completes a series of the processing operations in the boundary region forming process.

VI. Summary

With such technical means as those just described, the capacity of the page memory device 3 may be selected as appropriate to such an extent that the editing of picture images can be performed by an editing means 4, and, for the method of making access to the page memory device 3, it is feasible to employ a method already known to persons skilled in the art.

Also, the design of the editing means 4 may be modified as appropriate so long as the editing means 4 is capable of editing a plurality of sets of picture image data G ($G_1$ to $G_4$) into the page memory device 3 in a suitable manner in accordance with the editing mode. It is also feasible to design the system in such a manner that the picture image data G to be edited for the page memory device 3 are reduced as appropriate at the side of the picture image input unit 1. The system may be so designed that the editing means 4 is provided with a reducing process unit, whereby the picture image data G are edited for the page memory device 3.

Moreover, the boundary means 5 may be changed in design as appropriate so long as the means is capable of writing boundary region data M to at least some parts of the demarcating areas for the picture image data G in a plurality of sets ($G_1$ to $G_4$).

In this regard, the demarcating areas in the individual picture image data G indicate the range of the area in which each of the picture image data G is stored. For instance, in an arrangement of four sets of picture image data G in a state of their mutual contact, the demarcating areas, of course, include those boundary regions in which the individual sets of the picture image data G are set adjacent to each other, but also include the outer frame areas of the picture image data G in the individual sets. Moreover, the position where the boundary region data M are to be written in the demarcating area for each set of picture image data G can be changed in such a manner as thought fit by selecting a boundary region mode as appropriate under the user's instructions or the like.

Then, the boundary region data M mentioned above may be in any form so long as the data can be written to the demercating area of the picture image data G in each of the sets. If the user has a desire to gain an accurate recognition of the boundary in respect of the output of such data, it will be desirable to produce the boundary region data M in a visually perceptible form of data. Additionally, in response to the desire to arrange the individual sets of the picture image data G separately by securing an area without any picture image between the individual systems of picture image data G, it will be desirable to produce the boundary region data M in white data which are not visually perceptible. To fulfill both these requirements, it will be desirable to produce the boundary data M in a combination of visually perceptible data and visually imperceptible data.

Although, the boundary region data M mentioned above may be fixed in either of the forms in advance, a more versatile system enables the user to select the boundary region data M as he thinks fit, depending on his requirement. Therefore, it is desirable to design the system in such a manner that the boundary means 5 is provided with a variable setting device whereby changes can be made in items of the boundary region data M such as the thickness (thick line, extra thick line, fine line, and extra fine line, etc.), shape (solid line, dotted line, single dot chain line, two dot chain line, etc.), or color (in which case it is necessary to employ a construction permitting such selection of color in the output picture images at the side of the picture image output unit 2).

Furthermore, as regards the relationship between the image editing means 4 and the boundary means 5, it is desirable, from the viewpoint of expediting the processing operations, to design the system in such a manner that the boundary means 5 writes the boundary region data M at the same time as the editing means 4 is in the process of performing the editing of the picture images. On the other hand, it is desirable, from the viewpoint of ease in designing, to design the system in such a manner that the boundary means 5 writes the boundary region data M, entirely apart from the basic processing operations for editing the picture images, after the picture images are edited by the editing means 4.

In this respect, there is no impediment to selecting a means of a process whereby a boundary region is formed at the same time as the process for editing the picture images, as in the former case described above, but, from the viewpoint of a simplification of the equipment, it is desirable to design the boundary means 5 through utilization of the original functions of the editing means 4. For example, in one type of system the editing means 4 outputs an end-of-line signal, to indicate the final position of the picture image data on each scanning line for each set of picture image data G. When the editing means 4 edits the picture image data G in a plurality of sets of picture image data on the page memory device 3, an interrupt operation is performed, on the basis of this end-of-line signal, for the execution of the operation for editing the picture image data G on the next scanning line. In this type of system, it is feasible to design the system in such a manner that the boundary means 5 writes the boundary region data M while the editing means 4 is processing an interrupt operation.

Figure 1B:
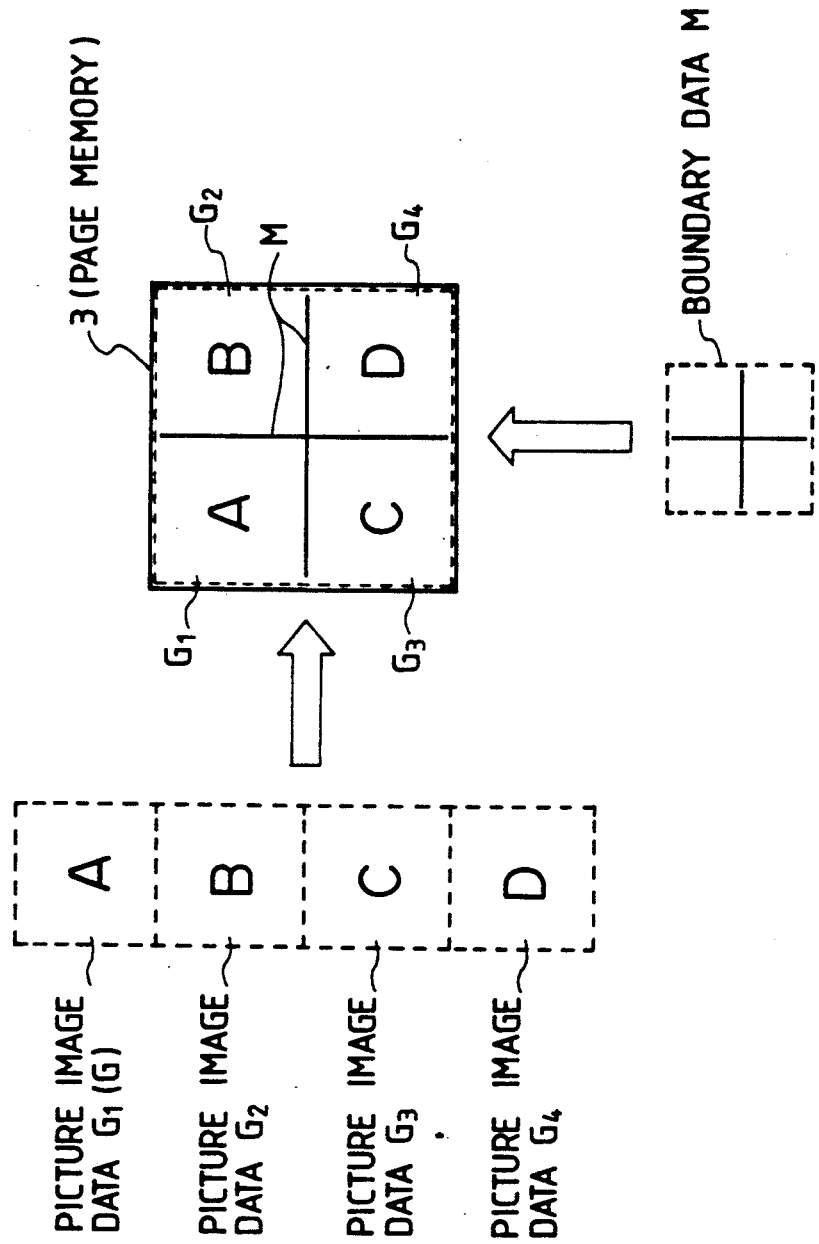

Also, with respect to the process for forming a boundary region (namely, the process for writing the boundary region data M), the design of the boundary means 5 may be modified as appropriate so that it is designed so as to overwrite the picture image data previously stored in the demarcating area when the editing means 4 is of the type which edits the plurality of sets of picture image data G so as to overwrite the previously designate demarcating areas with the picture image data, but writes the boundary region data M to the blank demarcating area when the editing means 4 is of the type which edits a plurality of sets of picture image data G for the page memory device 3 while a blank demarcating area is left in the page memory device, By the technical means as described above, the editing means 4 arranges a plurality of sets of picture image data G, in the state of being lined up in orderly vertical and horizontal patterns in the page memory device 3 in accordance with the prescribed editing mode (for example, the vertical and horizontal regular line-up mode). For example, the picture image data G in four sets, $G_1$ through $G_4$, which are input from the picture image input unit 1, is arranged as shown in FIG. 1(b).

Meanwhile, the boundary means 5 writes the prescribed boundary region data M in the demarcating areas on the basis of the prescribed boundary region mode, making reference to the editing mode by the editing means 4 mentioned above.

As the result of these operations, the plurality of sets of picture image data G, $G_1$ to $G_4$, and the boundary region data M are written as the picture image data G in single page format to the page memory device 3. Then, these picture image data G for one page are output as one whole unit to the picture image output unit 2.

As described hereinabove, the present invention provides a picture image editing system whereby desired boundary region data can be written to at least some of the demarcating areas of a plurality of sets of picture image data which have been edited for the page memory device, and the presence of the boundary region data assures a more accurate and certain recognition of the demarcations of the picture image data in a plurality of sets, and the picture image editing system according to the present invention therefore offers greater ease and higher efficiency in the execution of the subsequent processing jobs on the individual sets of picture image data as output to the picture image output unit.

Above all, the present invention can use boundary region data which can be visually perceptible, thereby making it possible for the user to gain an accurate recognition of the boundaries of a plurality of sets of picture image data when the plurality of sets of the edited picture image data are output in the form of hard copies or the like, so that the user will be able to perform such subsequent processing jobs as folding and cutting of the output with greater ease and higher efficiency and also to attain improved working efficiency, owing to the readily perceptible boundaries of the individual picture image data, in the processing operations of the edited picture image data, when any reediting job or any other subsequent processing job is to be performed on the edited picture image data fed into a workstation or the like.

Moreover, the present invention can use visually imperceptible demarcating areas, which make it possible to utilize demarcating areas other than the effective picture image areas.

Therefore, in a case where picture image data in a plurality of sets are arranged without any contact among the individual sets, with the boundary area data mentioned above being arranged in such a manner as to partition the picture image data, it is possible easily to set up a folding margin, a cutting margin, a pasting margin, and so forth at the time of an editing job in fulfillment of the requirements, such as the binding of hard copies output with a plurality number of sets of picture image data printed thereon. This feature makes it accordingly easier to perform the subsequent processing jobs on the picture image data on hard copies. In addition, if such edited picture image data are to be processed for their reediting or for any subsequent processing jobs, it will be easier for the user to perform such processing jobs as an extraction of picture images or a replacement of picture images to such an extent as one might expect from the separation of the boundaries of the individual picture image data.

Also, with the above-mentioned boundary region data provided in the outer frame area for a plurality of sets of picture image data, it will be possible effectively to avoid damage to the effective picture image area even if frame deleting process is performed at the side of the picture image output equipment.

Furthermore, the present invention can permit the setting of the boundary region data in a variable thickness and shape, so that the boundary region data may be set freely as the user thinks fit, and it will be possible to attain a further improvement on the working efficiency with which the subsequent processing operations can be performed on a plurality of sets of the picture image data.

Moreover, the present invention provides a system whereby the operations for writing the boundary region data can be performed in the course of the editing of picture images by an editing means. Therefore, the picture image editing system according to the present invention can effectively prevent such a situation that the time for the editing of picture images is prolonged unnecessarily.

Particularly, the present invention provides a picture image editing system which can perform the operations for writing the boundary region data while the CPU performs interrupt operations using the end-of-line signal, which is generated in the course of the editing of picture images by an editing means. It is therefore possible for the picture image editing system to realized the processing of a plurality of sets of picture images without any extension of the picture image editing time while satisfying the requirements for the simplification of system construction.

Furthermore, the present invention provides a picture image editing system wherein the boundary means can perform the writing of the boundary region data after the picture images ware edited by an editing means. It has been made possible to realize the functions of the boundary region forming means without any relation whatsoever to the editing means. On this account, it is possible to achieve a further simplification of the construction of the system.

Furthermore, the present invention provides a picture image editing system which can overwrite with boundary region data some part of the demarcating areas for the picture image data. Owing to this feature, it is not necessary to secure for the boundary region data any area in the page memory device other than the picture image area at the time when the picture images are edited by the editing means. It is therefore possible effectively to prevent a situation leading to greater complexity in the processing operations for the editing of picture images. In addition, since the demarcating area for the picture image data usually contains little of effective picture image information, the probability of deleting effective picture image information in the picture image data will be extremely low even if the picture image data in the demarcating areas are overwritten.

Moreover, the present invention proposes a picture image data editing system wherein the boundary region data can be written to a blank demarcating area. Therefore, the system can certainly avoid an accidental alteration of the picture image data in consequence of the writing of the boundary region data.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A picture image editing system for editing picture image data formed into scanning lines, the system comprising:
   receiving means for receiving picture image data;
   a page memory device for storing the received picture image data;
   editing means, coupled to the receiving means and the page memory device, for designating portions of the page memory device for storing demarcating area data, for editing the received picture image data by forming the received picture image data into a plurality of sets of picture image data, and for storing the sets of picture image data into the page memory device as composite picture image data in a single page format, said editing means including means for outputting an end-of-line signal indicating the position of the final picture image data on each scanning line, for writing the picture image data for a plurality of sets of picture image data into the page memory device, and for performing an interrupt operation in response to the end-of-line signal;
   boundary means for forming boundaries in the picture image data stored in the page memory device by writing desired boundary region data into the page memory device in at least some of the portions of the page memory device designated for storing demarcating area data, said boundary means including means for writing the boundary region data into the page memory device in the course of the interrupt; and
   means for outputting the picture image data and the boundary region data stored in said page memory device as composite picture image data.

2. A picture image editing system according to claim 1, in which:
   the editing means comprises means for storing a plurality of sets of picture image data in the page memory, portions of said sets of picture image data being stored in the designated portions of the page memory device designated for storing demarcating area data; and
   the boundary means comprises means for overwriting the picture image data previously stored in the designated portions of the page memory device.

3. A picture image editing system according to claim 2, wherein the boundary region data comprises one of data representing a visually perceptible image and a combination of data representing a visually perceptible image and data representing a visually imperceptible image.

4. A picture image editing system according to claim 3, comprising means for variably setting the thickness and shape of the boundaries represented by the boundary region data.

5. A picture image editing system according to claim 1, in which:
   the editing means comprises means for storing a plurality of sets of picture image data in the page memory device so as to leave the portions of the page memory device designated for demarcating area data blank; and
   the boundary means comprises means for writing the boundary region data into portions of the page memory device designated for demarcating area data.

6. A picture image editing system according to claim 5, wherein the boundary region data comprises one of data representing a visually perceptible image and a combination of data representing a visually perceptible image and data representing a visually imperceptible image.

7. A picture image editing system according to claim 6, comprising means for variably setting the thickness and shape of the boundaries represented by the boundary region data.

8. A picture image editing system according to claim 1, wherein the boundary region data comprises one of data representing a visually perceptible image and a combination of data representing a visually perceptible image and data representing a visually imperceptible image.

9. A picture image editing system according to claim 8, comprising means for variably setting the thickness and shape of the boundaries represented by the boundary region data.

10. A picture image editing system according to claim 1, in which the boundary means comprises means for writing the boundary region data after the editing means has performed the editing of picture image data.

11. A picture image editing system for editing picture image data formed into scanning lines, the system comprising:
   receiving means for receiving picture image data;
   a page memory device for storing the received picture image data;
   editing means, coupled to the receiving means and the page memory device, for designating portions of the page memory device for storing demarcating area data, for editing the received picture image data by forming the received picture image data into a plurality of sets of picture image data, and for storing the sets of picture image data into the page memory device as composite picture image data in a single page format, said editing means including means for storing a plurality of sets of picture image data in the page memory, portions of said sets of picture image data being stored in the designated portions of the page memory device designated for storing designated demarcating area data;

boundary means for forming boundaries in the picture image data stored in the page memory device by writing desired boundary region data into the page memory device in at least some of the portions of the page memory device designated for storing demarcating area data, said boundary means including means for overwriting the boundary region data onto the picture image data previously stored in the designated portions of the page memory device; and means for outputting the picture image data and the boundary region data stored in said page memory device as composite picture image data.

12. A picture image editing system according to claim 11, wherein the boundary region data comprises one of data representing a visually perceptible image and a combination of data representing a visually perceptible image and data representing a visually imperceptible image.

13. A picture image editing system according to claim 12, comprising means for variably setting the thickness and shape of the boundaries represented by the boundary region data.

14. A picture image editing system for editing picture image data formed into scanning lines, the system comprising:

receiving means for receiving picture image data;

a page memory device for storing the received picture image data;

editing means, coupled to the receiving means and the page memory device, for designating portions of the page memory device for storing demarcating area data, for editing the received picture image data by forming the received picture image data into a plurality of sets of picture image data, and for storing the sets of picture image data into the page memory device as composite picture image data in a single page format, said editing means including means for forming a plurality of sets of picture image data in portions of the page memory device other than the portions of the page memory device designated for demarcating area data;

boundary means for forming boundaries in the picture image data stored in the page memory device by writing desired boundary region data into the page memory device in at least some of the portions of the page memory device designated for storing demarcating area data, said boundary means including means for writing the boundary region data into the portions of the page memory device designated for demarcating area data; and means for outputting the picture image data and the boundary region data stored in said page memory device as composite picture image data.

15. A picture image editing system according to claim 14, wherein the boundary region data comprises one of data representing a visually perceptible image and a combination of data representing a visually perceptible image and data representing a visually imperceptible image.

16. A picture image editing system according to claim 15, comprising means for variably setting the thickness and shape of the boundaries represented by the boundary region data.

17. A picture image editing system for editing picture image data formed into scanning lines, the system comprising:

receiving means for receiving picture image data;

a page memory device for storing the received picture image data;

editing means, coupled to the receiving means and the page memory device, for designating portions of the page memory device for storing demarcating area data, for editing the received picture image data by forming the received picture image data into a plurality of sets of picture image data, and for storing the sets of picture image data into the page memory device as composite picture image data in a single page format;

boundary means for forming boundaries in the picture image data stored in the page memory device by writing desired boundary region data into the page memory device in at least some of the portions of the page memory device designated for storing demarcating area data, said boundary region data comprising one of data representing a visually perceptible image and a combination of data representing a visually perceptible image and data representing a visually imperceptible image; and means for outputting the picture image data and the boundary region data stored in said page memory device as composite picture image data.

18. A picture image editing system a according to claim 17, comprising means for variably setting the thickness and shape of the boundaries represented by the boundary region data.

19. A method for editing picture image data formed into scanning lines, the method comprising steps of:

receiving picture image data;

designating portions of a page memory device for storing demarcating area data;

forming the received picture image data into a plurality of sets of picture image data;

storing the sets of picture image data into the page memory device in a single page format;

outputting an end-of-line signal indicating the position of the final picture image data on each scanning line;

performing an interrupt operation in response to the end-of-line signal; and forming boundaries in the picture image data by writing desired boundary region data into the page memory device in the course of the interrupt in at least some of the portions of the page memory device designated for storing demarcating area data.

* * * * *